(12) United States Patent
Hara et al.

(10) Patent No.: US 11,691,225 B2
(45) Date of Patent: Jul. 4, 2023

(54) LASER CUTTING METHOD FOR PLATED STEEL SHEET, LASER PROCESSING HEAD AND LASER PROCESSING DEVICE

(71) Applicant: AMADA HOLDINGS CO., LTD., Kanagawa (JP)

(72) Inventors: Hideo Hara, Kanagawa (JP); Masanori Uehara, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 1 day.

Patent file contains an affidavit/declaration under 37 CFR 1.130(b).

(21) Appl. No.: 16/649,520

(22) PCT Filed: Oct. 2, 2018

(86) PCT No.: PCT/JP2018/036799
§ 371 (c)(1),
(2) Date: Mar. 20, 2020

(87) PCT Pub. No.: WO2019/069892
PCT Pub. Date: Apr. 11, 2019

(65) Prior Publication Data
US 2020/0306892 A1 Oct. 1, 2020

(30) Foreign Application Priority Data

Oct. 6, 2017 (JP) .................................. 2017-196013

(51) Int. Cl.
*B23K 31/10* (2006.01)
*B23K 26/14* (2014.01)
(Continued)

(52) U.S. Cl.
CPC .......... *B23K 31/10* (2013.01); *B23K 26/0006* (2013.01); *B23K 26/0665* (2013.01);
(Continued)

(58) Field of Classification Search
CPC .... B23K 26/38; B23K 31/10; B23K 26/1436; B23K 26/1438; B23K 26/0006;
(Continued)

(56) References Cited

U.S. PATENT DOCUMENTS 4,905,310 A * 2/1990 Ulrich ................ B23K 26/1435
219/121.72
5,142,119 A * 8/1992 Hillman ............... B23K 26/123
219/121.84
(Continued)

FOREIGN PATENT DOCUMENTS

CA 3024686 11/2017
CN 101378875 A 3/2009
(Continued)

OTHER PUBLICATIONS

Machine English Translation of JP-2009226473-A (Year: 2009).*
(Continued)

*Primary Examiner* — Sang Y Paik
*Assistant Examiner* — Erwin J Wunderlich
(74) *Attorney, Agent, or Firm* — Greenblum & Bernstein, P.L.C.

(57) ABSTRACT

Laser cutting on a plated steel sheet is executed by cutting the plated steel sheet by irradiating the plated steel sheet covered with a plate metal with laser light at a wavelength in a 1 micrometer band; and emitting assist gas onto a cut surface of the plated steel sheet, the cut surface being formed in the step of cutting, to make the plate metal fused by irradiation of the laser light flow to the cut surface so as to cover the cut surface with the plate metal.

14 Claims, 30 Drawing Sheets

(51) Int. Cl.
| | |
|---|---|
| *B23K 26/00* | (2014.01) |
| *B23K 26/06* | (2014.01) |
| *B23K 26/08* | (2014.01) |
| *B23K 26/12* | (2014.01) |
| *B23K 35/38* | (2006.01) |
| *B23K 37/04* | (2006.01) |
| *B23K 37/06* | (2006.01) |
| *B23K 26/38* | (2014.01) |
| *B23K 26/40* | (2014.01) |
| *B23K 103/04* | (2006.01) |
| *B23K 101/34* | (2006.01) |

(52) U.S. Cl.
CPC .......... *B23K 26/08* (2013.01); *B23K 26/0869* (2013.01); *B23K 26/123* (2013.01); *B23K 26/14* (2013.01); *B23K 26/1436* (2015.10); *B23K 26/1438* (2015.10); *B23K 26/1464* (2013.01); *B23K 26/38* (2013.01); *B23K 35/383* (2013.01); *B23K 37/0408* (2013.01); *B23K 37/06* (2013.01); *B23K 26/40* (2013.01); *B23K 2101/34* (2018.08); *B23K 2103/04* (2018.08)

(58) Field of Classification Search
CPC ............ B23K 26/0665; B23K 26/0869; B23K 26/123; B23K 26/1464; B23K 35/383; B23K 37/0408; B23K 37/06; B23K 2103/04; B23K 26/14; B23K 2101/34; B23K 26/40; B23K 26/08; B32K 26/0648; B32K 26/38
USPC .......................................................... 219/67
See application file for complete search history.

(56) References Cited

U.S. PATENT DOCUMENTS

| | | | | |
|---|---|---|---|---|
| 5,767,479 | A * | 6/1998 | Kanaoka | B23K 26/60 219/121.72 |
| 5,889,253 | A * | 3/1999 | Kanaoka | B23K 26/60 219/121.72 |
| 8,222,565 | B2 * | 7/2012 | Schaefer | B23K 26/38 219/121.72 |
| 9,415,465 | B2 * | 8/2016 | Hirano | B23K 26/0734 |
| 10,245,677 | B2 * | 4/2019 | Luzius | B23K 26/0876 |
| 10,759,005 | B2 * | 9/2020 | Hara | B23K 26/40 |
| 11,559,857 | B2 * | 1/2023 | Hara | B23K 26/38 |
| 2005/0092725 | A1 * | 5/2005 | Byrd | B23K 26/389 219/121.84 |
| 2009/0218326 | A1 * | 9/2009 | Chouf | B23K 26/14 219/121.72 |
| 2013/0200052 | A1 | 8/2013 | Wittwer | |
| 2015/0273387 | A1 | 10/2015 | Hayashi et al. | |
| 2016/0035603 | A1 * | 2/2016 | Ikenoue | B23K 26/03 219/121.65 |
| 2020/0346306 | A1 * | 11/2020 | Hara | B23K 26/1436 |

FOREIGN PATENT DOCUMENTS

| | | | | |
|---|---|---|---|---|
| JP | 11-104879 | | 4/1999 | |
| JP | 2001038485 A | * | 2/2001 | .......... B23K 26/064 |
| JP | 2009-226473 | | 10/2009 | |
| JP | 2009226473 A | * | 10/2009 | |
| JP | 2009-287082 | | 12/2009 | |
| JP | 2014-503359 | | 2/2014 | |
| JP | 2014-237141 | | 12/2014 | |
| JP | 2014237141 A | * | 12/2014 | |
| JP | 2015-171954 | | 10/2015 | |
| JP | 2016078024 A | * | 5/2016 | .......... B23K 26/064 |
| JP | 6202504 | | 9/2017 | |
| JP | 6202504 B1 | * | 9/2017 | ............ B23K 26/02 |
| JP | 6238185 | | 11/2017 | |
| WO | WO-2006112542 A1 | * | 10/2006 | ............... B05D 7/14 |
| WO | WO-2013039161 A1 | * | 3/2013 | ......... B23K 26/0734 |
| WO | WO-2016059951 A | * | 4/2016 | ............. B23K 26/00 |

OTHER PUBLICATIONS

Machine English Translation of WO-2013039161-A1 (Year: 2013).*
Machine English Translation of JP-2014237141-A (Year: 2014).*
Machine English Translation of WO-2006112542-A1 (Year: 2006).*
Machine English Translation of WO-2016059951-A1 (Year: 2016).*
Machine English translation of JP-2001038485-A (Year: 2001).*
Machine English translation of JP-2016078024-A (Year: 2016).*
Machine English translation of JP-6202504-B1 (Year: 2017).*
Ghany, K. et al; "Using a Nd: YAG laser and six axes robot to cut zinc-coated steel;" 2006; The International Journal of Advanced Manufacturing Technology 28, pp. 1111-1117 (Year: 2006).*
Extended European Search Report for EP Application No. 18865115.2 dated Dec. 22, 2020.
Official Communication issued in International Patent Application No. PCT/JP2018/036799, dated Dec. 11, 2018, along with English translation.
2nd Official Action from the Chinese Patent Office in corresponding Chinese Patent Application 201880064248.0, dated Dec. 27, 2021.

* cited by examiner

FIG. 7
(A)
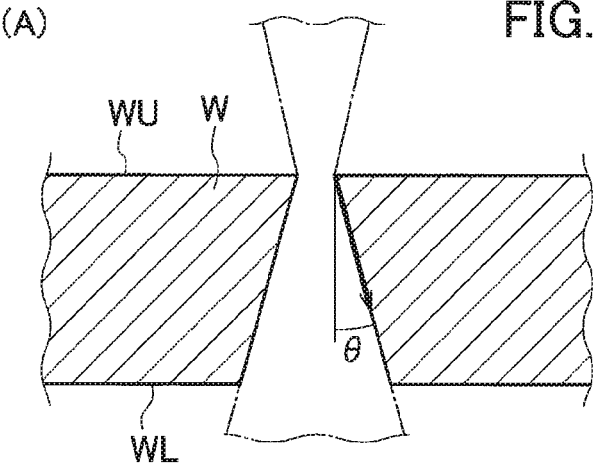
(a)
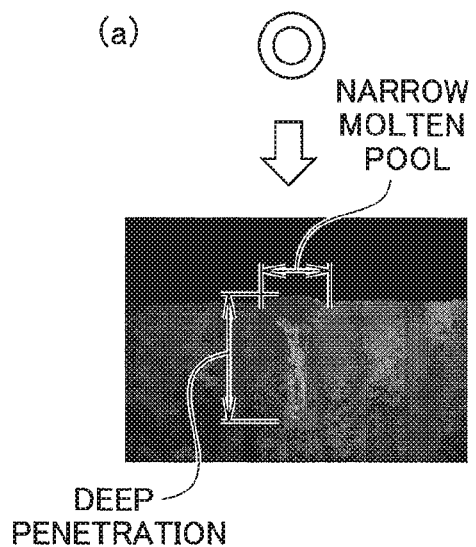
NARROW MOLTEN POOL
LASER IRRADIATION
DEEP PENETRATION
(B)
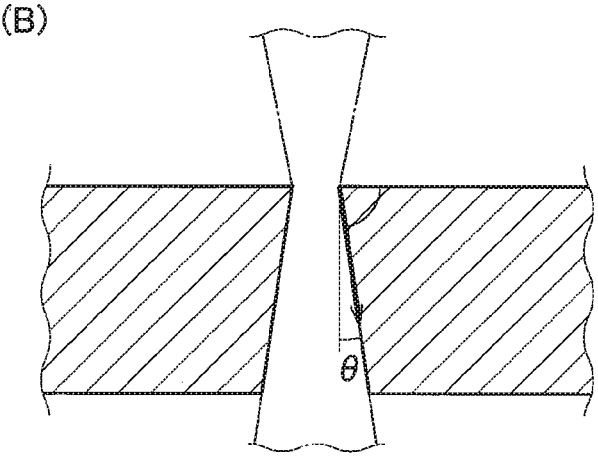
(b)
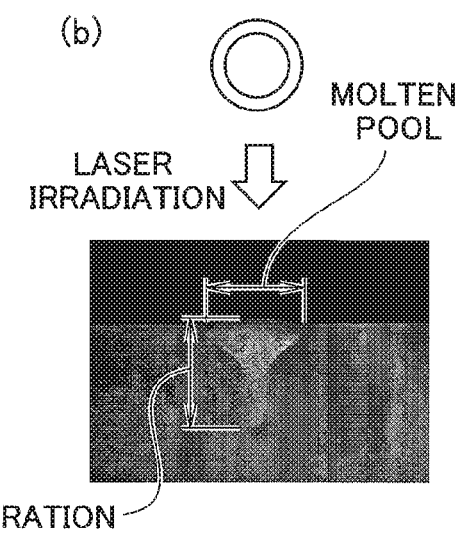
MOLTEN POOL
LASER IRRADIATION
PENETRATION
(C)
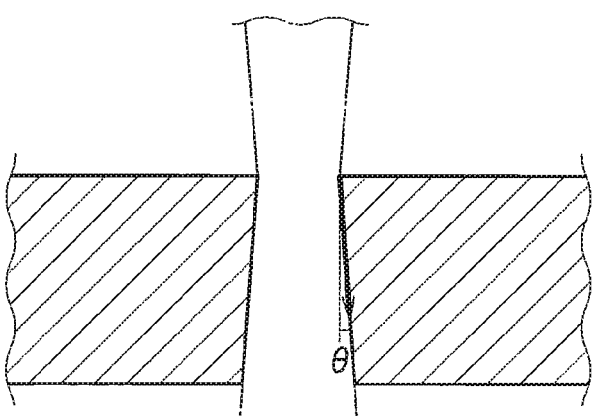
(c)
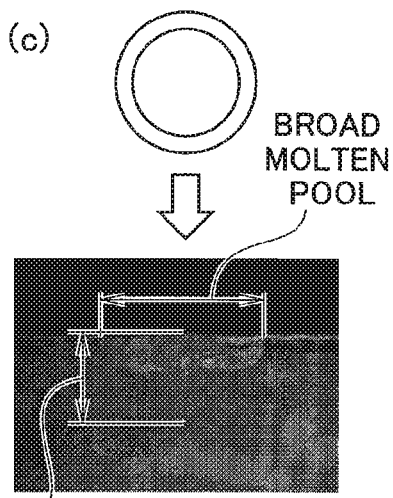
BROAD MOLTEN POOL
SHALLOW PENETRATION FIG. 10
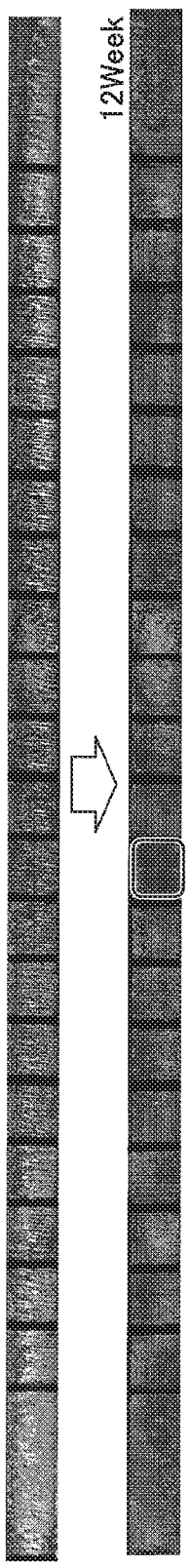
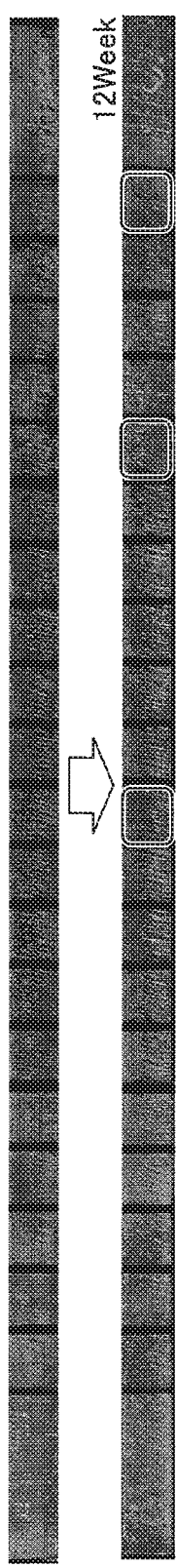
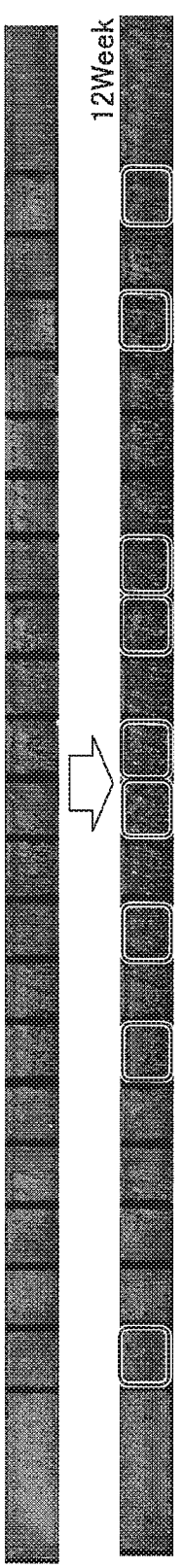

FIG. 13
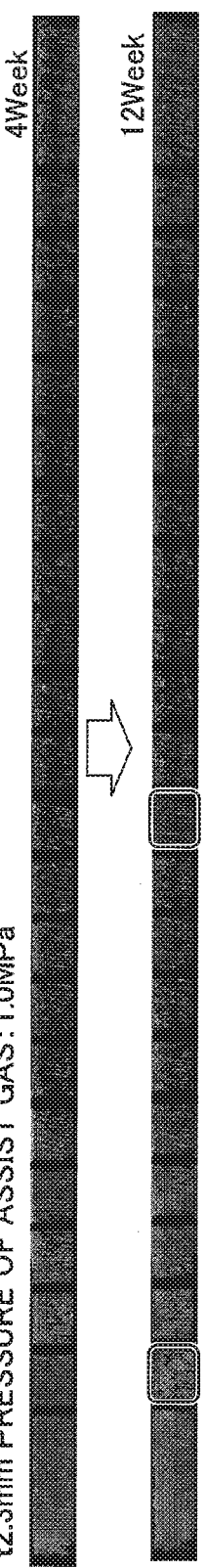
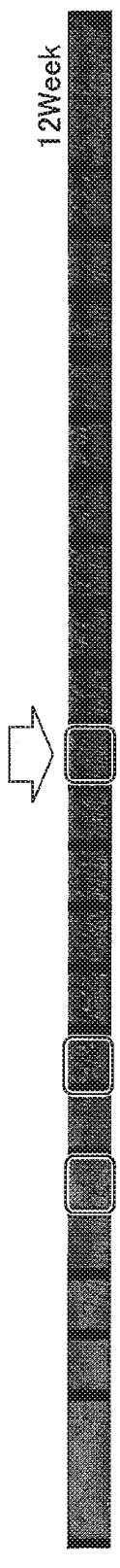

FIG. 14
PROCESSING CONDITION F:7000mm/min NOZZLE GAP:0.3mm
NOZZLE DIAMETER:D4.0 FOCUSED POSITION:0.0mm
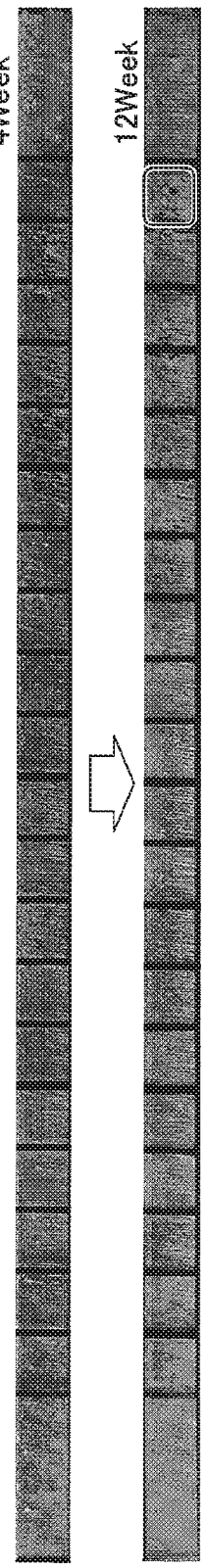
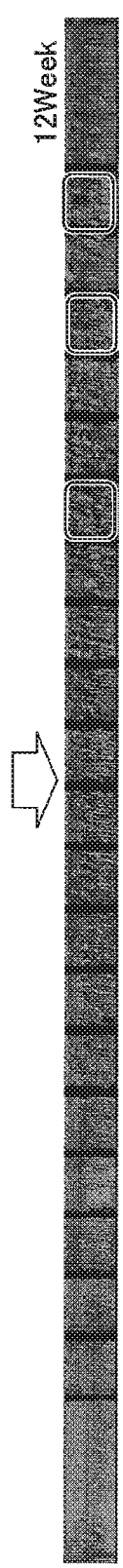
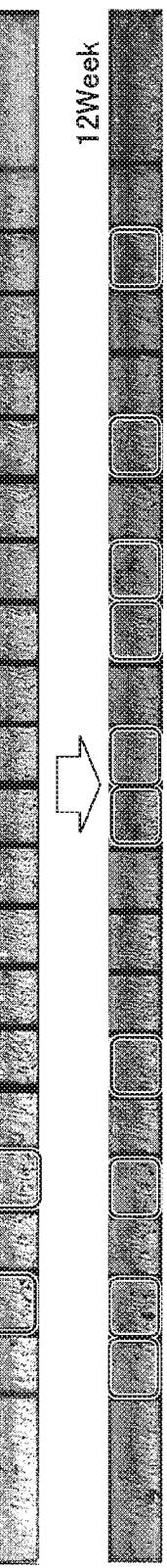

LASER CUTTING METHOD FOR PLATED STEEL SHEET, LASER PROCESSING HEAD AND LASER PROCESSING DEVICE

TECHNICAL FIELD

The disclosure herein relates to a laser cutting method, a laser processing head, and a laser processing device for cutting Zn-plated steel sheets with using laser light at a wavelength in a 1 micrometer band. In more detail, the disclosure herein relates to a laser cutting method, a laser processing head, and a laser processing device for, on the occasion of carrying out laser cutting with using fiber laser for example, blowing plate metal on its upper surface, which is fused by means of irradiation of laser light, to flow to the cut surface with assist gas, and covering the cut surface with the flowed plate metal.

BACKGROUND ART

Zn-plated steel sheet, where being cut, on its cut surface exposes bare steel and thereby tends to generate red rust (simply referred to as "rust" hereinafter). Thus there has been proposed an art in which, at the occasion of cutting the plated steel sheet, the plate layer on its upper surface is partly guided to the cut surface to form a zinc-attached surface on the cut surface, thereby suppressing rusting. The PTL 1 discloses a related art.

Further, there has been proposed an art in which laser light such as carbon dioxide laser, YAG laser, or fiber laser is used for cutting Zn-plated steel sheets to suppress generation of rust on cut surfaces. The PTL 2 discloses a related art.

CITATION LIST

Patent Literature

PTL 1: Japanese Patent Application Laid-open No. 2009-287082

PTL 2: Japanese Patent Application Laid-open No. 2014-237141

SUMMARY OF THE INVENTION

The PTL 1 discloses a configuration in which, when cutting a plated steel sheet with a die and a punch, a clearance between the die and the punch is regulated to make zinc on the surface of the plated steel sheet flow onto the end surface. Specifically, the PTL 1 suggests that generation of rust can be suppressed by guiding the overlay on the plated steel sheet partly to the cut surface.

By means of the punch and the die, however, it is uneasy to carry out cutting along a complex curve. Further, it is uneasy to cover the whole cut surface with part of the overlay.

In the PTL 2, oxygen is used as assist gas at the occasion of carrying out laser cutting on a Zn-plated steel sheet. This assist gas, when cutting the plated steel sheet, blows the molten plated steel sheet away, promotes cutting by heat generated by oxidation reaction, and forms an oxide layer on the cut end surface. This oxide layer suppresses reduction of the antirust ability of the cut surface.

Specifically, the art described in the PTL 2 to form an oxide layer over the whole area of the cut end surface originated from laser cutting on the plated steel sheet so as to delay the period of starting rusting. The art described in the PTL 2 is not to guide the molten overlay on the upper surface to the cut surface at the occasion of laser cutting and thereby cover the cut surface with a part of the overlay.

The art disclosed hereinafter has an object of guiding a part of a molten plate layer on an upper surface at the occasion of carrying out laser cutting on a Zn-plated steel sheet to cover the cut surface with the plate metal.

According to an aspect, a laser cutting method for a plated steel sheet, is provided with: cutting the plated steel sheet by irradiating the plated steel sheet covered with a plate metal with laser light at a wavelength in a 1 micrometer band; and emitting assist gas onto a cut surface of the plated steel sheet, the cut surface being formed in the step of cutting, to make the plate metal fused by irradiation of the laser light flow to the cut surface so as to cover the cut surface with the plate metal.

According to another aspect, a laser processing head in use for cutting a plated steel sheet by irradiating the plated steel sheet covered with a plate metal with laser light at a wavelength in a 1 micrometer band and emitting assist gas onto a cut surface of the plated steel sheet, the cut surface being formed in the step of cutting, to make the plate metal fused by irradiation of the laser light flow to the cut surface so as to cover the cut surface with the plate metal, the laser processing head is provided with a nozzle configured to emit the assist gas onto the cut surface, and an auxiliary gas nozzle configured to emit auxiliary gas for guiding a molten plate metal blown away by the assist gas emitted through the nozzle to the cut surface.

According to still another aspect, a laser processing device is provided with a work table configured to support a plated steel sheet as a workpiece, a laser processing head configured to irradiate the workpiece with laser light with moving relative to the workpiece to cut the workpiece, a laser oscillator configured to develop oscillation to radiate and supply laser light at a wavelength in a 1 micrometer band to the laser processing head, moving means for moving the laser processing head relative to the workpiece, pressure regulation means for supplying assist gas to the laser processing head with controlling a pressure of the assist gas, laser light regulation means for regulating a condensed light diameter and a Rayleigh length of the laser light incident onto the workpiece, focused position regulation means for controlling a focused position of the laser light incident onto the workpiece, a control device configured to control actions of the laser oscillator, the moving means, the pressure regulation means, the laser light regulation means and the focused position regulation means, and data input means for inputting required data to the control device.

ADVANTAGEOUS EFFECTS OF INVENTION

At the occasion of carrying out laser cutting on a plated steel sheet with laser light at a wavelength in the 1 micrometer band, part of a plate layer on an upper surface of the plated steel sheet would be fused and/or evaporated and, as assist gas guides the plate metal to the cut surface, the cut surface is covered with at least part thereof.

BRIEF DESCRIPTION OF THE DRAWINGS

FIG. 7 is an explanatory drawing showing a shape of laser beam.

FIG. 10 is an explanatory drawing showing results of exposure tests depending on nozzle diameters.

FIG. 13 is an explanatory drawing showing results of exposure tests depending on assist gas pressures.

FIG. 14 is an explanatory drawing showing results of exposure tests depending on assist gas pressures.

DESCRIPTION OF EMBODIMENTS

According to the art disclosed in the PTL 1, at the occasion of cutting a plated steel sheet, a plate layer on its upper surface is partly guided to the cut surface to form a zinc-attached surface on the cut surface, thereby suppressing rusting on the cut surface.

Thus the inventors carried out a test as to whether a plate layer on an upper surface could be guided to a cut surface to cover the cut surface in a case where a plated steel sheet was cut by laser cutting with a fiber laser. The test condition will be described below.

LASER CUTTER: FOL-AJ4000 (AMADA Co., Ltd.)
LASER POWER: 4 kW
TEST PIECE: a steel sheet plated with zinc-alloy of 6% aluminum, 3% magnesium, and the balance of zinc; thickness t=3.2 mm K35 (coating weight on one side 175 g/m$^2$)
CUT SAMPLE DIMENSION: 90 mm×20 mm
STANDARD PROCESSING CONDITION (a condition for a case where a steel sheet with a thickness of t=3.2 mm is cut by laser cutting)
  nozzle diameter: S2.0 (2.0 mm)
  cutting speed: P7000 (7000 mm/min)
  assist gas: nitrogen
  assist gas pressure: 1.7 MPa
  nozzle gap: 0.3 mm (a gap between an upper surface of the plated steel sheet and a lower end section of the nozzle)
  focused position: 0.0 mm (positive values for upper and negative values for lower relative to the upper surface of the workpiece as zero)
  condensed light diameter 0.151 mm, a Rayleigh length 1.688 mm Laser cutting with a fiber laser was carried out under the standard processing condition described above. Further, exposure tests were executed for 4 weeks. Results of the exposure tests were summarized in FIG. 1(A). As being apparent from FIG. 1(A), rusting on the cut surfaces was observed after two-week exposure. Thereafter, rusting was more frequently observed as time advanced, and much rusting was observed after four-week exposure.

As being understood, in a case where plated steel sheets are cut by a fiber laser, under the standard processing condition for laser cutting on the steel sheet, a rust prevention effect by partly guiding a plate layer on an upper surface to cover the cut surface was observed. It is further expected to create the rust prevention effect.

Figure 1:
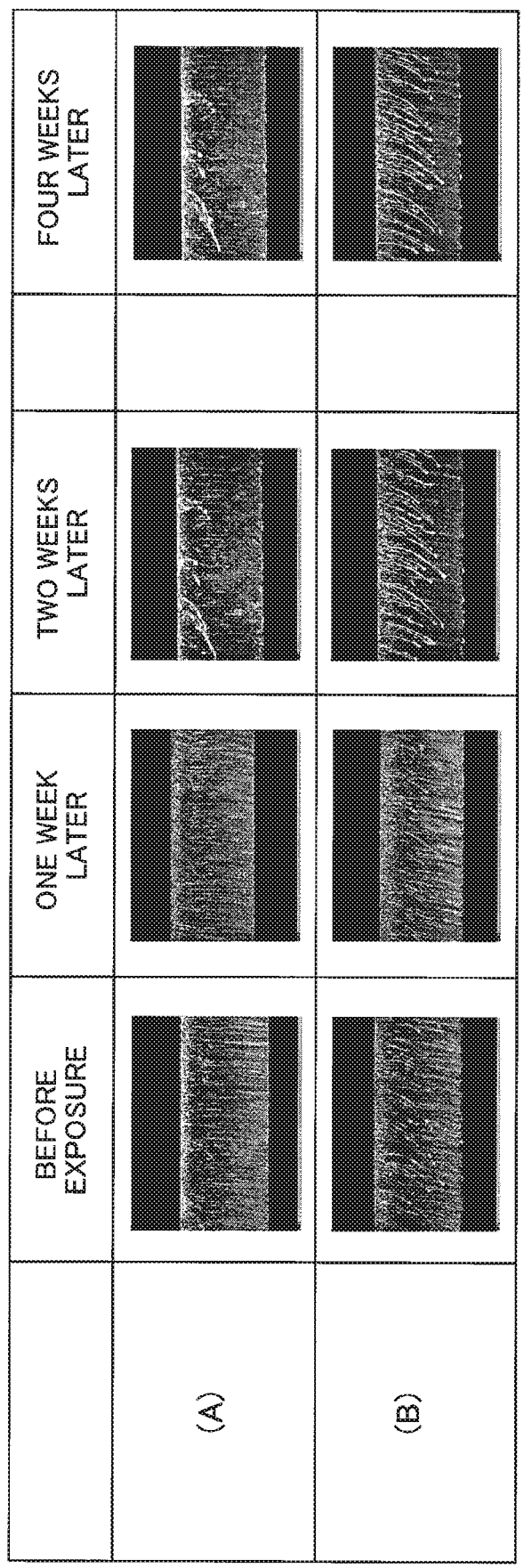
FIG. 1 is an explanatory drawing in which results obtained by exposure tests for plated steel sheets cut under a standard processing condition for a fiber laser are compared with results obtained by exposure tests for plated steel sheets cut by a modified beam profile for the fiber laser.

Then laser cutting was executed with varying the condensed light diameter and the Rayleigh length as a beam profile of the fiber laser variously, and exposure tests were carried out. In a case where laser cutting was executed by regulating the condensed light diameter to be 0.183 mm and the Rayleigh length to be 2.178 mm, and exposure tests were carried out, then the test pieces did not exhibit rusting as shown in FIG. 1(B) even after four weeks and thus a better rust prevention effect could be acknowledged than that by the standard processing condition. Then it is found out that, in addition to regulation of the condensed light diameter and the Rayleigh length, various changes in the processing condition allow to further guide the plate layer on the upper surface to cover the cut surface.

The disclosure hereinafter is based on the knowledge described above.

Certain embodiments will be described below with reference to the appended drawings.

Figure 2:
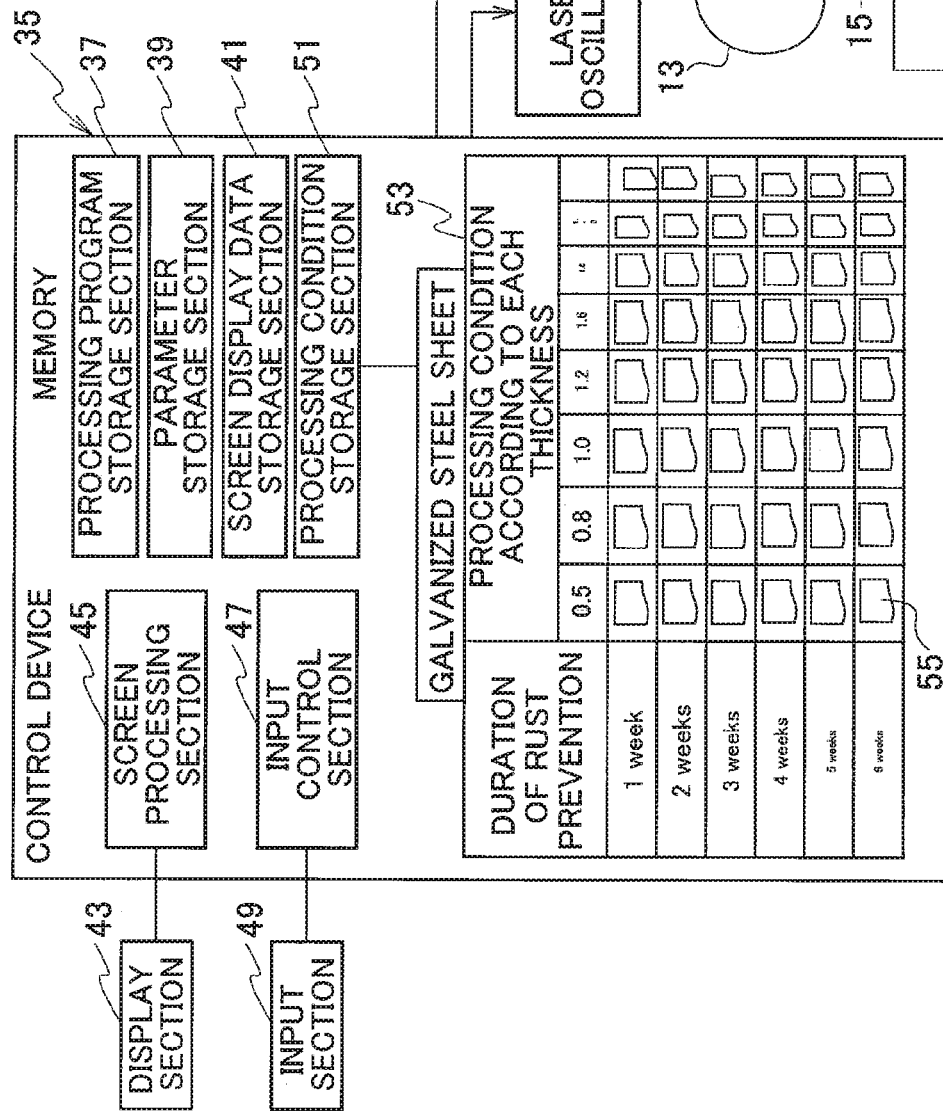
FIG. 2 is a functional block diagram schematically or generally showing a constitution of a laser processing device according to an embodiment.

Referring to FIG. 2, a laser processing device 1 according to the present embodiment is provided with a worktable 3 that supports a workpiece W of a sheet-like shape and a laser processing head 5 for executing laser cutting. The laser processing head 5 is configured to irradiate the workpiece W with laser light LB to carry out cutting. The worktable 3 is movable in the X and Y directions relative to the laser processing head 5 and the laser processing device 1 is further provided with positioning motors 7 such as servomotors or such for moving and positioning the worktable 3 relatively in the X and Y directions. Further the laser processing device 1 is provided with a Z-axis motor 9 for moving and positioning the laser processing head 5 in directions relatively closer to and away from the workpiece W (Z-axis direction).

Further, the laser processing device 1 is provided with a laser 11 such as a fiber laser oscillator, a DDL oscillator, a disk laser oscillator, a YAG laser oscillator or such, which develops oscillation to radiate laser light (laser light at a wavelength in a 1 micrometer band). The laser oscillator 11 and the laser processing head 5 are mutually connected via transmission fibers 13. The laser processing head 5 is provided with a CF lens (collimate lens) 15 for rendering the laser light LB out of the transmission fibers 13 into a parallel ray, a divergent ray or a convergent ray, and the CF lens 15 is movable, and capable of being positioned, in the direction along the light axis. The laser processing head 5 is further provided with an actuator 17 for moving and regulating the CF lens 15 in the direction of the light axis.

Further, the laser processing head 5 is provided with an AO mirror (variable curvature mirror) 21 that reflects the laser light LB passing through the CF lens 15 toward a condenser lens 19. This AO mirror 21 has, by applying pressure via air or such to a pressurizing means 21A, variability in curvature on its reflective surface. The AO mirror 21 is thereby capable of rendering the rejected light into a divergent ray, a parallel ray or a convergent ray.

As being understood, by regulating the position of the CF lens 15 and/or the curvature of the AO mirror 21, an incident beam diameter of the laser light LB onto the condenser lens 19 can be regulated. In other words, the laser processing device 1 is capable of regulating a Rayleigh length and a condensed light diameter of the laser light LB.

Further, the laser processing head 5 is provided with a nozzle 23 that emits assist gas toward a laser processing position of the workpiece W.

Instead or additionally the laser processing head 5 may be provided with a side nozzle and the assist gas may be emitted through the side nozzle toward the section subject to the laser processing.

Further, the laser cutting device 1 is provided with an assist gas supply device 25. The assist gas supply device 25 is provided with a nitrogen gas supply device 27 and a pressure regulation valve 33 for regulating pressure of the assist gas supplied to the laser processing head 5. As the nitrogen gas supply device 27 and the pressure regulation valve 33 are placed into operation, nitrogen gas, as the assist gas, is supplied to the section subject to the processing.

The assist gas supply device 25 is capable of supplying a mixture gas of about 97% nitrogen and about 3% oxygen. The assist gas supply device 25 is provided with a mixer 31 and the mixer 31 admixes a predetermined amount of oxygen or air in an oxygen gas supply source (air supply source) 29 with nitrogen in a nitrogen gas supply source 27 to generate a mixture gas. As the gas mixer 31 and the pressure regulation valve 33 are placed into operation, the mixture gas in predetermined concentrations is, as the assist gas, supplied to the section subject to the processing.

As the configuration for supplying the assist gas of about 97% nitrogen gas and about 3% oxygen gas to the section subject to the laser processing, another configuration may be instead used. As described in Japanese Patent serial 3291125 for example, a separation device using a hollow-fiber membrane is applicable so that supplied compressed air can be separated into nitrogen and oxygen.

In addition, the laser cutting device 1 is provided with a control device 35. This control device 35 includes a computer controlled by a software and this software realizes a function of controlling the laser processing head 5 in light of its motion and positioning relative to the workpiece and a function of controlling laser output by the laser oscillator 11 and feeding pressure of the assist gas to the laser processing head 5.

The control device 35 further has a function of regulating the position of the CF lens 15 and the curvature of the reflective surface of the AO mirror 21. Thus, by regulating the position of the CF lens 15 and the curvature of the AO mirror 21 independently or simultaneously, the condensed light diameter and the Rayleigh length (beam profile) at a tame of cutting the workpiece W can be regulated.

According to the configuration described above, after laying the workpiece W on the worktable 3 in place, the control device 35 or any manual means moves and positions the laser processing head 5 in the X, Y and Z axis directions relative to the workpiece W. Next, the control device 35 regulates the position of the CF lens 15 and/or the curvature of the AO mirror 21 so as to regulate the incident beam diameter onto the condenser lens 19 and thereby regulates the beam profile of the laser beam LB. The control device 35 makes the laser oscillator 11 develop oscillation and causes the condenser lens 19 to irradiate the workpiece N with the laser light LB. In parallel, the control device 35 places the assist gas supply device 25 into operation to emit the assist gas through the laser processing head 5 to the section subject to the laser processing in the workpiece W, thereby carrying out laser cutting on the workpiece W.

The present, embodiment, at a time of carrying out laser cutting on a plated steel sheet by a fiber laser, by making the laser light have a proper beam profile and fusing and/or evaporating a plate layer on the upper surface of the plated steel sheet to make the fused and/or evaporated plate metal flow to the cut surface, enables the flown plate metal to cover the cut surface.

Figure 3:
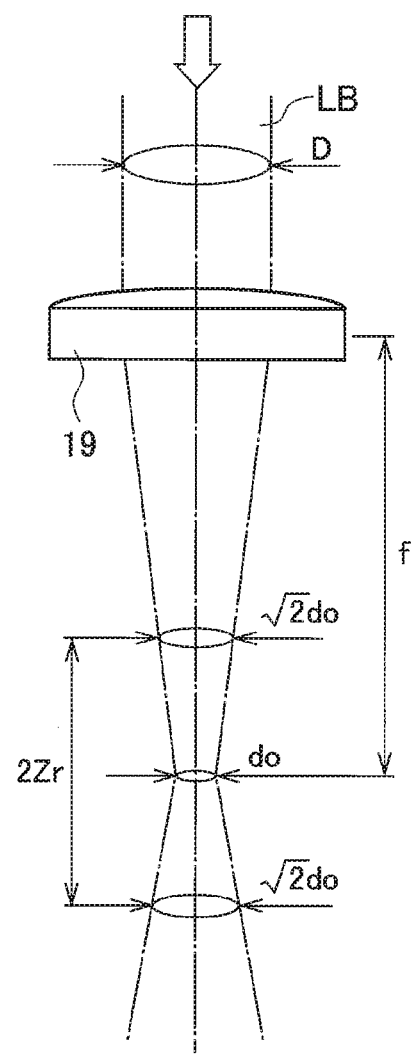
FIG. 3 is an explanatory drawing showing that a beam profile of laser light can be regulated by regulating a diameter D of a beam incident to a lens.

By the way, where an incident beam diameter and a condensed light diameter (diameter of the beam) of laser light LB on the condenser lens 19 in a beam profile of laser light are represented by D and do respectively, as shown in FIG. 3, the condensed light diameter do as a beam diameter at a position of a beam waist where the beam is squeezed to a minimum can be obtained by the following equation.

$$do = M^2 \frac{4\lambda}{\pi D} f = BPP \frac{4}{D} f \qquad (1)$$

FIG. 3 illustrates that a distance along a light axis, which a beam with a condensed light diameter do at a beam waist position travels until it diverges to be in the square root of 2 times do in diameter, is two times longer than the Rayleigh length, namely 2Zr. The Rayleigh length Zr is also referred to as a depth of focus and is given by:

$$Zr = \frac{\pi do^2}{4M^2 \lambda} = \frac{do^2}{4BPP} \qquad (2)$$

where A represents a wavelength of the light, f represents a focal length, D represents an incident beam diameter onto the condenser lens 19, and $M^2$ and BPP represent beam qualities.

As being apparent from the equation (1), by regulating the incident beam diameter C, the condensed light diameter do can be regulated. Further, by regulating the condensed diameter do, the Rayleigh length Zr can be regulated.

By regulating the position of the CF lens 15, the laser light LB passing through the CF lens 15 can be rendered into any of a divergent ray, a parallel ray and a convergent ray.

Further, by means of the AO mirror 21, by rendering its reflective surface into a convex surface, the incident parallel ray can be reflected as a divergent ray. Further, by rendering the reflective surface into a flat surface or a concave surface, the incident parallel ray can be reflected as a parallel ray or a convergent ray.

More specifically, by regulating the position of the CF lens 15, regulating the curvature of the AO mirror 21, or combining regulating the position of the CF lens 15 and regulating the curvature of the AO mirror 21, the beam incident diameter D of the laser light LB onto the condenser lens 19 can be regulated. In other words, by regulating the condensed light diameter do and the Rayleigh length Zr, the beam profile can be regulated.

Described above was an example in which the position of the CF lens 15 and the curvature of the reflective surface of the AO mirror 21 are regulated so as to regulate the beam profile but it is not necessarily limited thereto. Any mechanism for regulating the condensed light diameter and the Rayleigh length is applicable.

Figure 4:
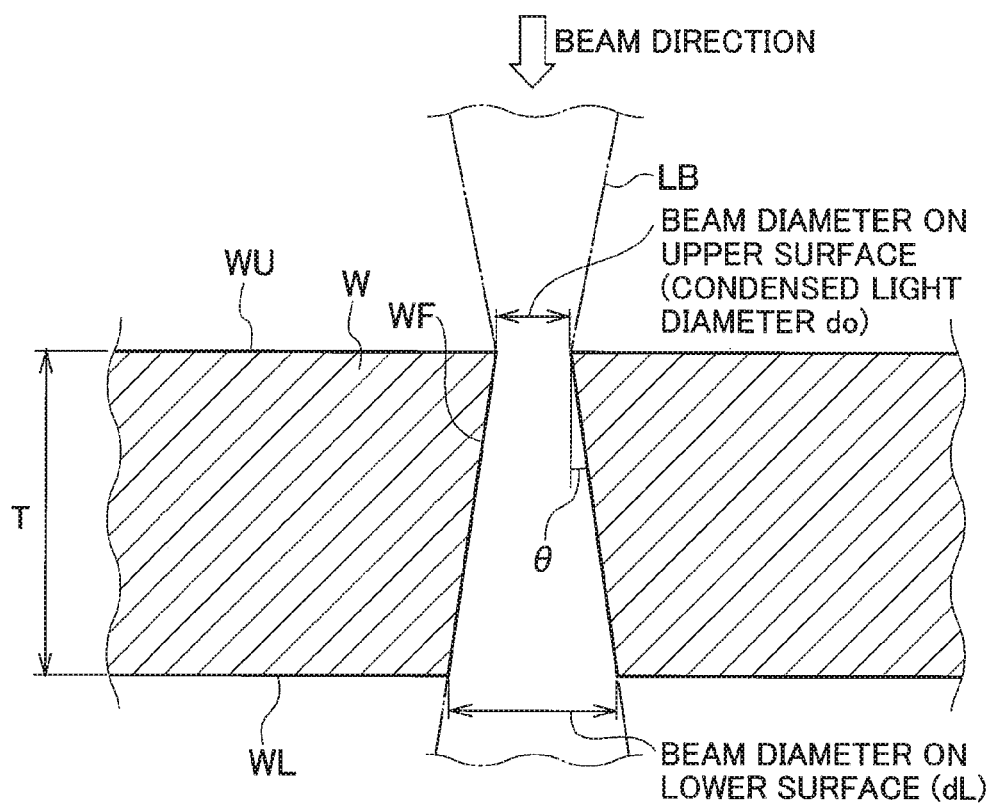
FIG. 4 is an explanatory drawing showing that a spread angle θ of a beam can be determined if a beam profile of laser light is known.

If the condensed light diameter do and the Rayleigh length Zr of the laser beam were known, its beam shape viewed from the side relative to the direction perpendicular to the direction where the laser light LB passes can be drawn as in FIG. 4. Further, on the basis of such a geometric relation, the beam diameter dL at the workpiece lower surface WL in a case where the laser cutting is carried out with focusing the light on the upper surface WU of the workpiece W of a thickness T can be calculated and an angle between the drawn beam LB and the workpiece upper surface WU, namely a divergent angle θ in one direction of the laser beam LB relative to the light axis of the laser beam LB, can be calculated. This slope θ will be hereinafter referred to as a divergent angle of the laser beam LB.

As being understood already, as the divergent angle θ of the beam gets smaller, a gap between the cut surfaces WF (a width of the cut groove) at a lower surface WL on the workpiece W gets slightly larger than that at an upper surface. Conversely, as the divergent angle θ of the beam gets gradually larger, the gap between the cut surfaces WF (the width of the cut groove) at the lower surface WL on the workpiece U gradually gets larger.

By regulating the lens beam incident diameter D in which the laser beam LB is made incident onto the condenser lens 19, the condensed light diameter do can be arbitrarily regulated. And, as the condensed light diameter do is regulated, the Rayleigh length Zr is regulated. More specifically, the beam profile is regulated. In other words, as the beam profile is regulated, the divergent angle θ of the beam of the laser beam LB relative to the workpiece upper surface WU can be regulated.

Figure 5:
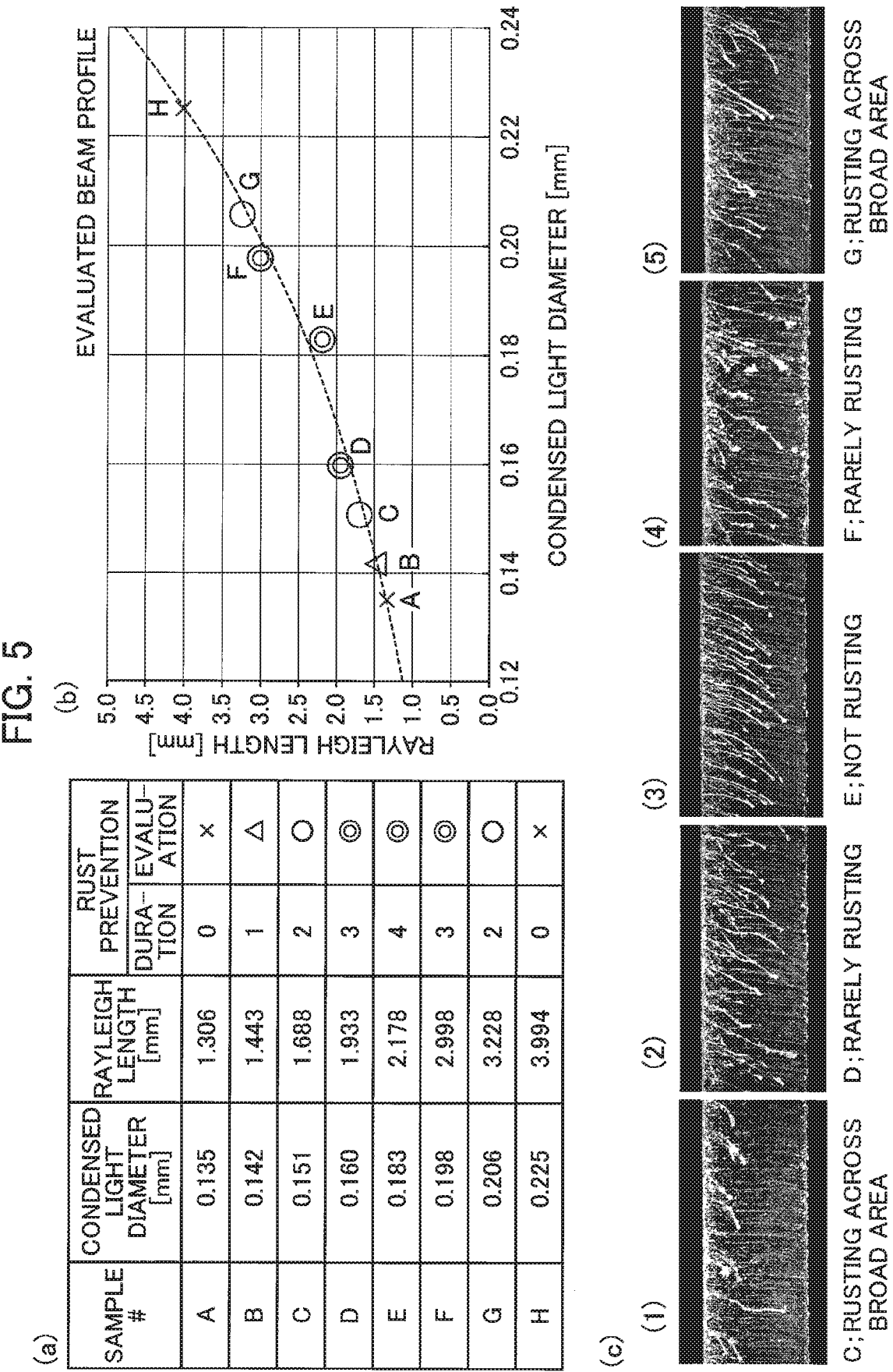
FIG. 5 is an explanatory drawing showing results obtained by exposure tests for plated steel sheets cut under conditions with various beam profiles of the fiber laser.

To affirm the effect of regulating the beam profile, the following tests were carried out. The beam profile of the condensed light diameter 0.151 mm and the Rayleigh length 1.688 mm used for cutting the plated steel sheet with the thickness 3.2 mm by the fiber laser under the foregoing standard condition was varied in various ways, thereby laser cutting was carried out and exposure tests were executed. The processing device here was FOL-AJ4000 commercially available from AMADA Co., Ltd. and its beam profile (the condensed light diameter and the Rayleigh length) was measured by a focus monitor. The test results are generally shown in FIG. 5. In the meantime, the focused position was set, at the upper surface (±0.0 mm) of the workpiece.

As will be understood from FIG. 5(*a*), in the sample A in a case of the condensed light diameter 0.135 mm and the Rayleigh length 1.306 mm, the duration of rust prevention was one week or less (0 weeks) and thus this sample was determined not to create a good rust prevention effect. In the sample B in a case of the condensed light diameter 0.142 mm and the Rayleigh length 1.443 mm, the duration of rust prevention was one week and thus this sample was determined to create a rust prevention effect. In the sample C in a case of the condensed light diameter 0.151 mm and the Rayleigh length 1.688 mm, two weeks were observed as the duration of rust prevention. In the sample D in a case of the condensed light diameter 0.160 mm and the Rayleigh length 1.933 mm, three weeks were observed as the duration of rust prevention.

Further, in the sample E in a case of the condensed light diameter 0.183 mm and the Rayleigh length 2.178 mm, four weeks were observed as the duration of rust prevention. In the sample F in a case of the condensed light diameter 0.198 mm and the Rayleigh length 2.998 mm, three weeks were observed as the duration of rust prevention. In the sample G in a case of the condensed light diameter 0.206 mm and the Rayleigh length 3.228 mm, two weeks were observed as the duration of rust prevention. In the sample H in a case of the condensed light diameter 0.225 mm and the Rayleigh length 3.994 mm, one week or less (0 weeks) was observed as the duration of rust prevention.

Photographs of cut surfaces after four weeks in the samples C to G are shown as in (1) to (5) in FIG. 5(*c*). And, the evaluated beam profile is drawn as a broken line in FIG. 5(*b*).

As will be understood from the cut tests about the samples A to H, as the condensed light diameter and the Rayleigh length of the laser light are changed in various ways, the durations of rust prevention change accordingly.

Here, while the beam profile at a time of laser cutting on the sample A is exaggeratingly depicted, as shown in FIG. 7(A), the condensed light diameter at the workpiece upper surface is small and the Rayleigh length is short.

According to such a beam profile, as shown in FIG. 7(*a*), at the workpiece upper surface, a laser energy density is high, a molten pool is narrow, penetration becomes deep, and therefore heat concentrates only on the neighbor around the cut width.

Specifically, the range where the plated component is fused and evaporated is narrow.

This demonstrates that a sufficient amount of molten plated component to cover the cut surface cannot be obtained.

Further, as the condensed light diameter at the workpiece upper surface is small, the cut width at the workpiece upper surface also becomes narrow so that the assist gas cannot sufficiently flow toward the cut surface.

More specifically, it demonstrates that the molten plated component cannot be driven by the flow of the assist gas to sufficiently flow toward the cut surface.

In light of the foregoing, since the molten plated component on the workpiece upper surface is not sufficient, the molten plated component cannot come around to the cut surface as the assist gas is unlikely to flow around the cut surface, and the cut surface is not sufficiently covered with the molten plated component, it is considered that it tends to be inferior in effect of rust prevention. Meanwhile, the drawings shown in FIG. 7(a), and FIGS. 7(b) and 7(c) explained hereinafter, are what respectively illustrate photographs of sections showing penetration states where test pieces were irradiated with laser lights of beam profiles of the sample A, the sample E and the sample H under the same power for the same very short time, and double circles drawn on the photographs illustrate differences of molten pools of the respective samples viewed from above.

In the case of the sample a, as shown in FIG. 7(B), the condensed light diameter at the workpiece upper surface is larger as compared with that in the case of the sample A. The Rayleigh length is longer than that in the case of the sample A.

Further, as shown in FIG. 7(b), the laser energy density at the workpiece upper surface is lower than that of the sample A, the molten pool is broader, and the penetration becomes shallow, and thus the heat widely diffuses from the vicinity of the cut width to the peripheries.

More specifically, the range where the plated component on the workpiece upper surface fuses becomes broader than that in the case of the sample A. This means that a sufficient amount of the plated component to cover the cut surface could fuse.

Further, since the condensed light diameter at the workpiece upper surface is larger than that in the case of the sample A, the cut width on the workpiece upper surface becomes broader. This demonstrates that the assist gas more sufficiently flows to the cut surface as compared with the case of the sample A.

More specifically, by getting the sufficient amount of the molten plated component enough to cover the cut surface and as well making the assist gas sufficiently flow in order to pour the molten plated component toward the cut surface so that the cut surface is covered with the molten plated component, it is considered to create the tendency to provide a sufficient effect of rust prevention.

In the case of the sample H, as shown in FIG. 7(C), the condensed light diameter at the workpiece upper surface is larger than those in the cases of the samples A and E.

Specifically, since the energy density is lower than those in the cases of the samples A and E, it is necessary to input greater energy in order to carry out cutting. Further, as shown in FIG. 7(c), the molten pool becomes broader, the penetration becomes shallower, the range where temperature on the material surface rises becomes broader, the plated component on the workpiece upper surface is fused more, and therefore it is enabled to get a sufficient amount of the molten plated component enough to cover the cut surface.

Because the cut width at the workpiece upper surface gets broader and the Rayleigh length gets longer as compared with those in the cases of the samples A and E, the cut groove width is rendered uniform over the full thickness from the workpiece upper surface WU to the workpiece lower surface WL.

The flow speed of the assist gas in the workpiece W is therefore retained to be a high speed along it from its upper surface to the lower surface, and the molten plated component is exhausted out without adhering to the cut surface and thus the molten plated component cannot sufficiently adhere to the cut surface.

It is therefore considered that the high speed of the assist gas from the upper surface to the lower surface causes the tendency of insufficiency in the effect of rust prevention on the cut surface.

Therefore, at the occasion of carrying out laser cutting on a plated steel sheet, it is preferable to set the condensed light diameter and the Rayleigh length within a proper range in order to guide a part of a plate layer on its upper surface and cover the cut surface with the guided part of the plate layer.

Figure 6:
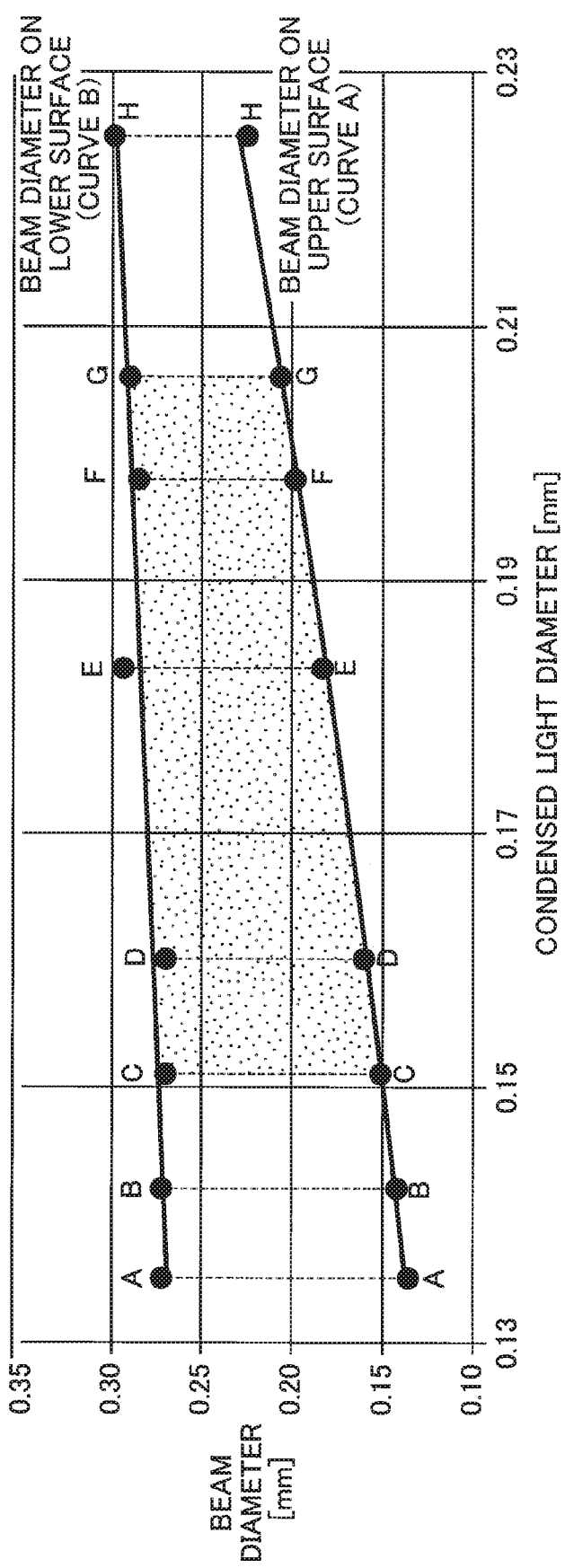
FIG. 6 is an explanatory drawing illustrating how beam diameters differ at an upper surface and a lower surface of a workpiece.

The relation between the beam diameter at the workpiece upper surface and the beam diameter at the workpiece lower surface in the workpiece of 3.2 mm in thickness for example in the samples A to H could be illustrated as in FIG. 6. A group of combinations of dotted lines connecting vertically points on a curve A that expresses upper surface beam diameters of identical condensed light diameters with points on a curve B that expresses lower surface beam diameters is drawn on a graph of condensed light diameter-beam diameter.

Combinations that cause durations of rust prevention to be two weeks or more are shown as a range with hatching on FIG. 6. Effects of rust prevention in connection with the condensed light diameters and the Rayleigh lengths are, as described already, summarized in a table shown in FIG. 5(a). And, a range that may be considered to be expected to create an effect of rust prevention is, provided that a range providing a duration of rust prevention longer than one week is good as shown in FIG. 5(b), a range from the sample B to the sample G, and is, provided that a range providing a duration of rust prevention over three weeks, a range from the sample D to the sample F.

Within the scope obtained by the results by these samples, conditions around a condition of the condensed light diameter 0.183 mm and the Rayleigh length 2.178 mm, which is that of the sample F, are most notable for a case of carrying out laser cutting on a plated steel sheet by a fiber laser.

Thus the following tests were carried out with keeping the condensed light diameter to be 0.183 mm and the Rayleigh length to be 2.178 mm in carrying out laser cutting to examine influences of nozzle diameter, assist gas pressures, nozzle gaps, focused positions and cutting speeds.

LASER CUTTER: FOL-AJ4000 (AMADA Co., Ltd.)
LASER POWER: 4 kW
PERIOD FOR EXPOSURE TEST: 12 weeks In the meantime, while the laser power was 4 kW, as the power change, the cutting speed range also changes in proportion to the power. As the laser power gets higher for example, the cutting speed range that enables cutting tends to get faster.

Figure 8:
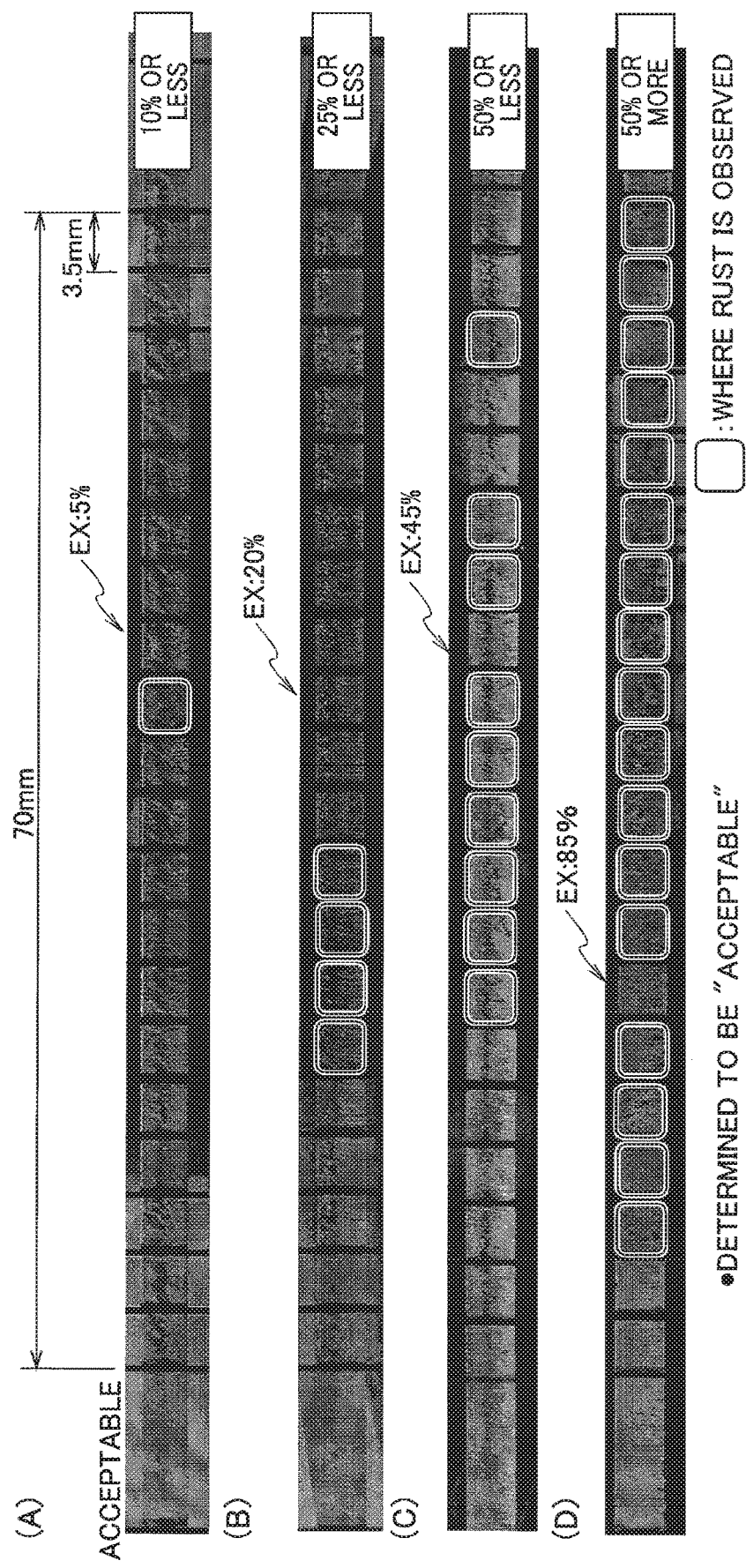
FIG. 8 is an explanatory drawing about evaluation of exposure tests.

In regard to the evaluation of the effect of rust prevention, each cut surface on each sample, in a range of 70 mm around each center, was divided equally into twelve sections and the number of sections where rust is observed (sections boxed up in squares) was counted, thereby carrying out the evaluation. FIG. 8(A) shows that the number where rust is observed is one and it is 10% or less in ratio, FIG. 8(B) that the number is four and 20% (25% or less), FIG. 8(C) that the number is nine and 45% (50% or less), and FIG. 8(D) that the number is seventeen and 85% (51% or more). And, in the case of this embodiment, cases of 10% or less were determined to be "ACCEPTABLE".

Figure 9:
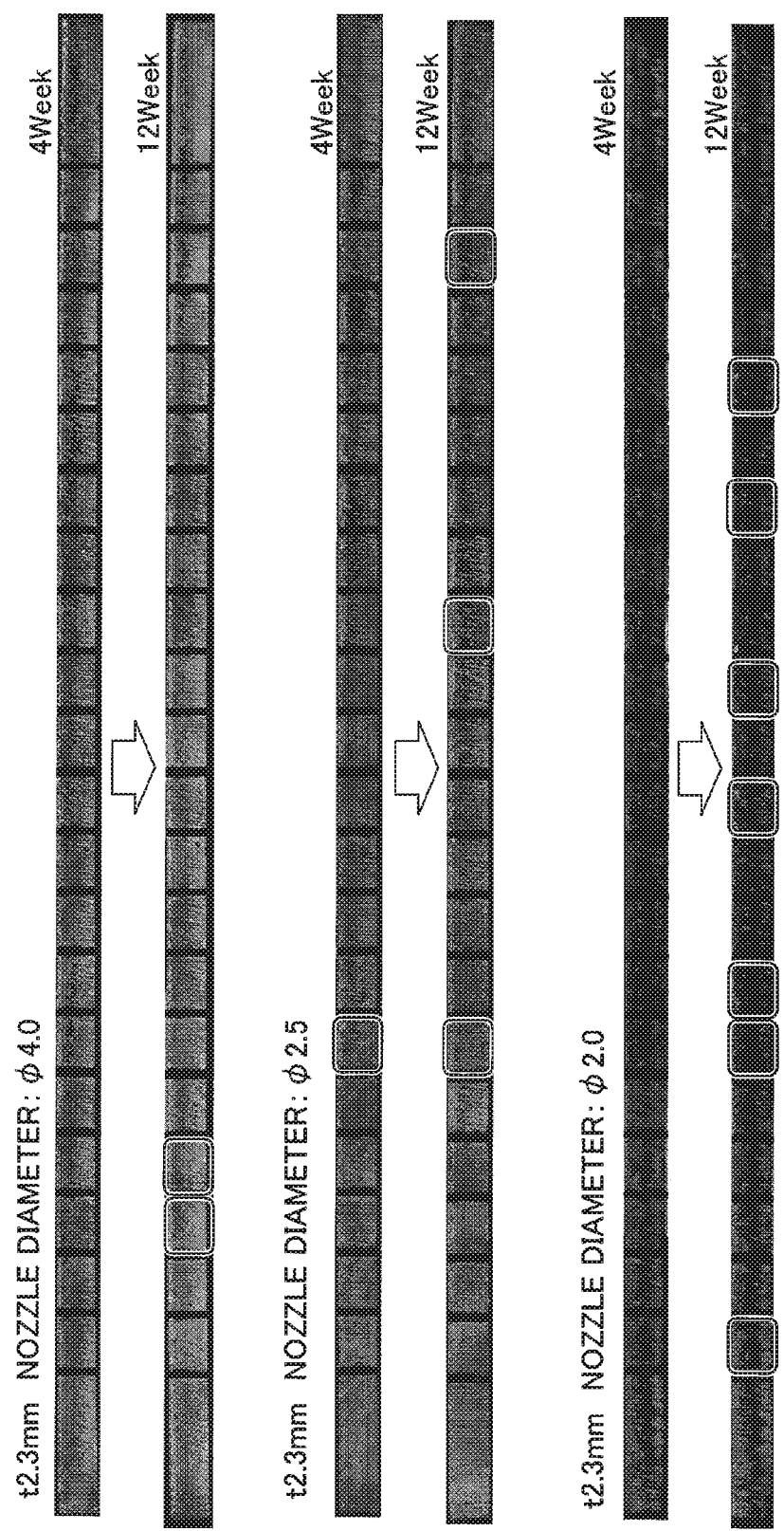
FIG. 9 is an explanatory drawing showing results of exposure tests depending on nozzle diameters.
Figure 11:
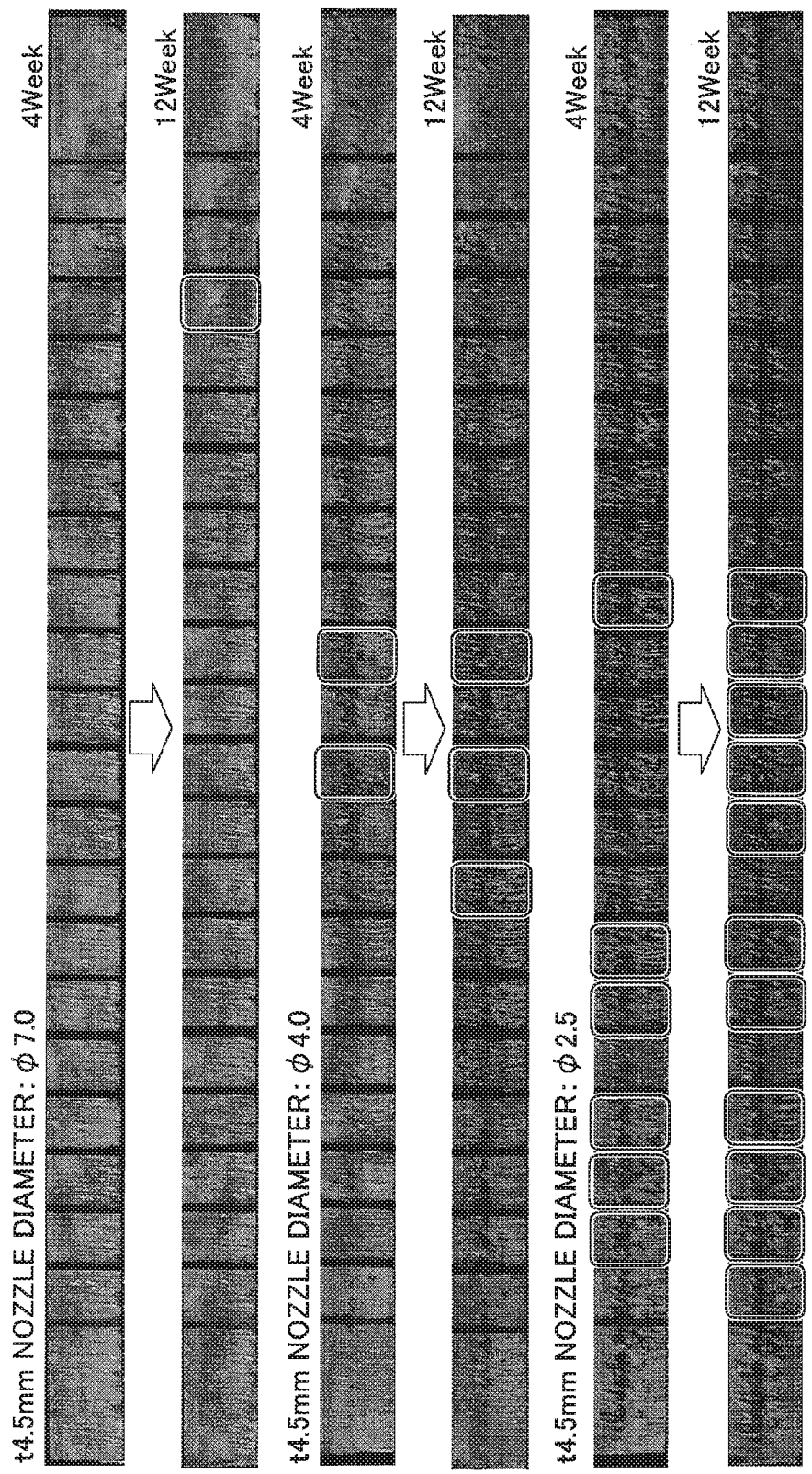
FIG. 11 is an explanatory drawing showing results of exposure tests depending on nozzle diameters.

Next, plated steel sheets with differences only in thickness, namely thicknesses were respectively t=2.3 mm, t=3.2 mm and t=4.5 mm, were cut by laser cutting in a range of nozzle diameters from 2.0 mm to 7.0 mm, Results obtained by exposure tests for 12 weeks are shown in FIGS. 9-11. Meanwhile, the results shown in FIGS. 9-11 are only representative of a number of exposure test results and as well present results obtained by exposure tests for 4 weeks as being understood from the changes in progress of rusting. As explained in FIG. 8, sections where rust is observed are boxed up in squares. Meanwhile, the similar applies to FIGS. 13-15, FIGS. 17-19, FIGS. 21-23 and FIGS. 26-28. Meanwhile, the processing conditions are indicated at the heads of the respective drawings, and cutting was carried out under proper conditions of cutting speeds (F: 10000 mm/min or such) and assist gas pressures in accordance with changes in thickness of the sheets to be cut. And, the results shown in FIGS. 9-11 and effects of rust prevention obtained by the other exposure tests were rendered into a graph shown in FIG. 12.

Figure 12:
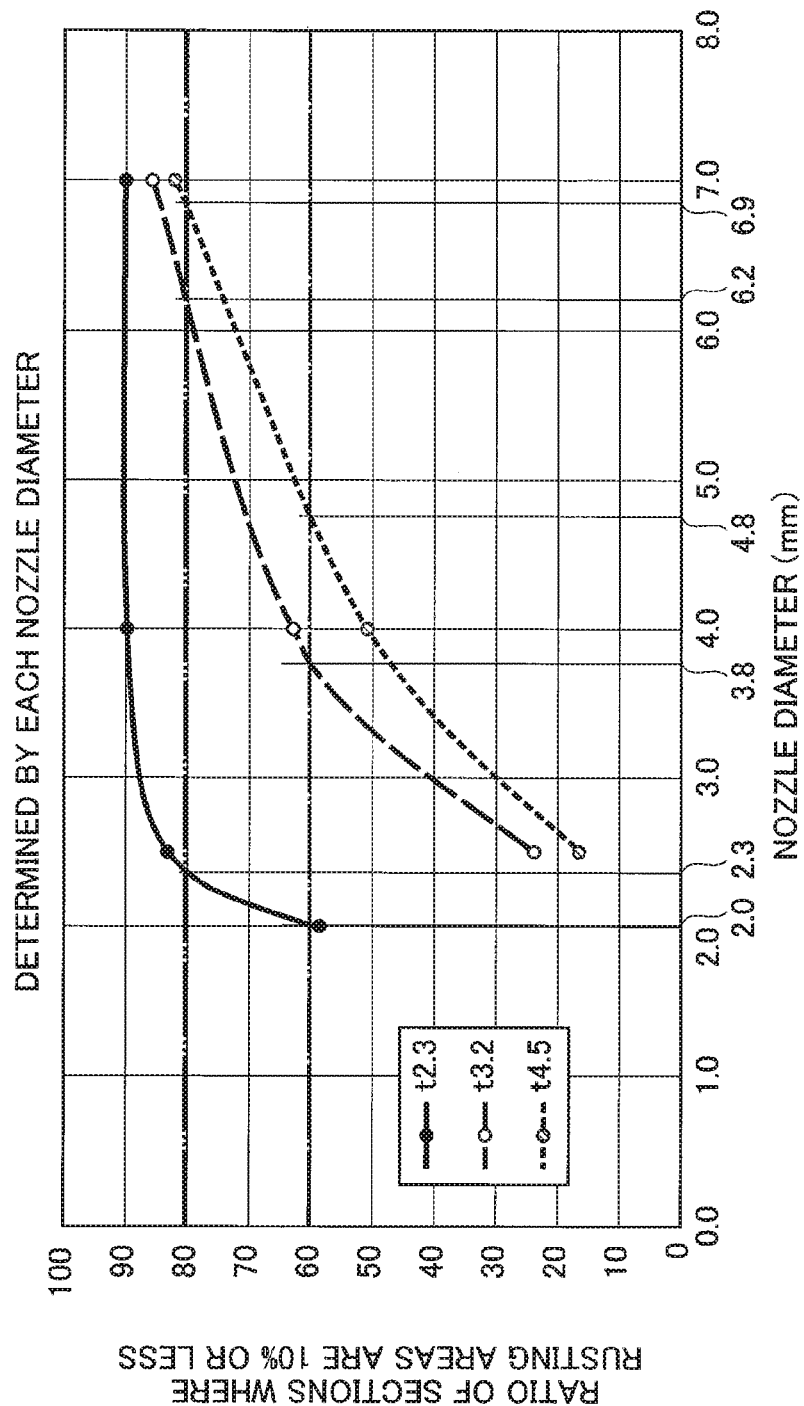
FIG. 12 is an explanatory drawing that summarizes the results of the exposure tests shown in FIGS. 9-11.
Figure 15:
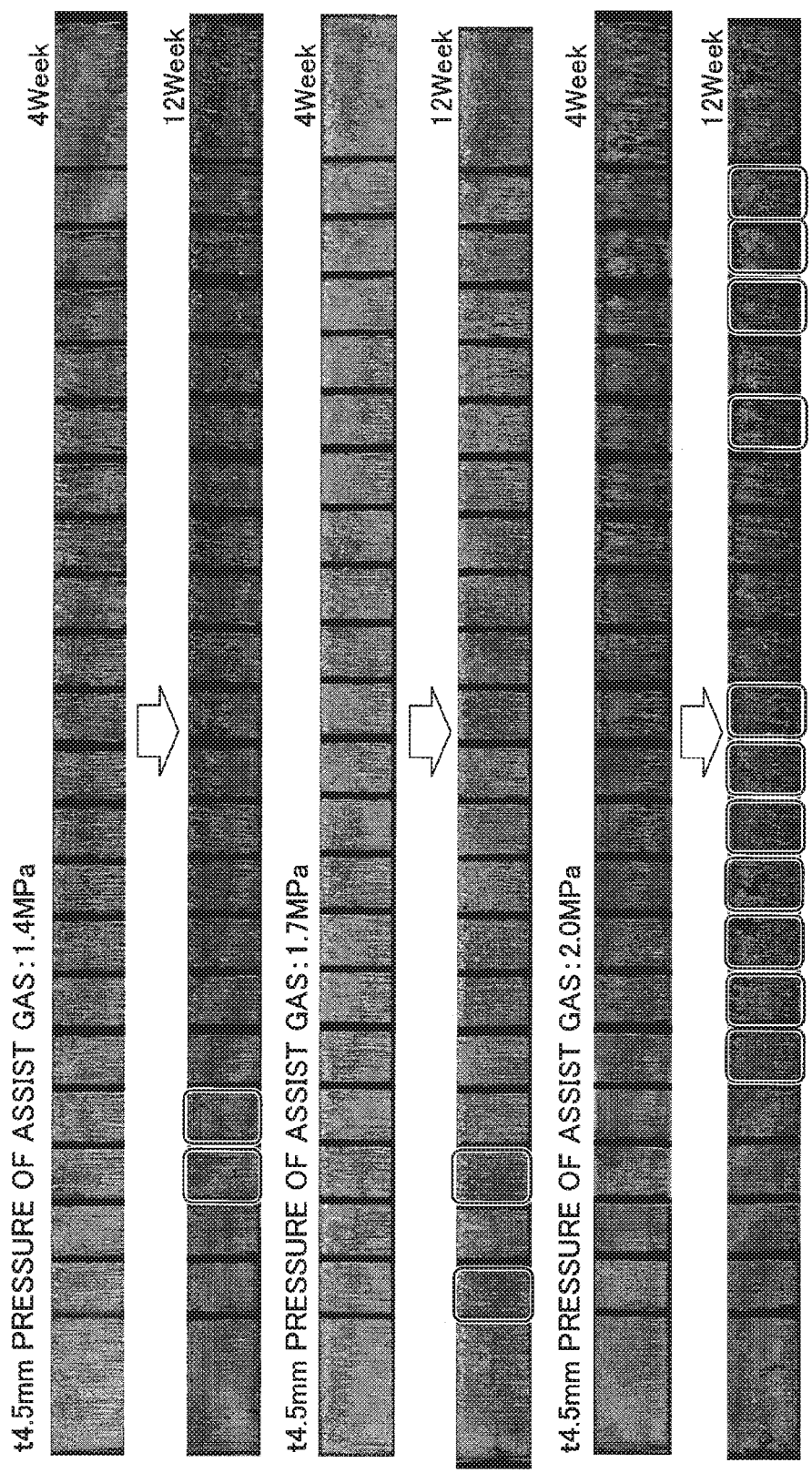
FIG. 15 is an explanatory drawing showing results of exposure tests depending on assist gas pressures.

As being apparent from FIG. 12, as the nozzle diameter gets larger, the ratio of rusting in 10% or less increases.

Specifically, in the case of the thickness t=2.3 mm, if the nozzle diameter reaches 2.0 mm, the ratio where rusting is 10% or less increases up to about 60% or more. And, if the nozzle diameter reaches 2.3 mm or larger, it increases over 80% or more. Therefore, it is preferable in light of rust prevention to make the nozzle diameter larger.

Similarly, as being apparent from FIG. 12, in the case of the thickness t=3.2 mm, if the nozzle diameter reaches 3.8 mm, the ratio where rusting is 10% or less increases up to about 60% or more. And, if the nozzle diameter reaches 6.2 mm or greater, it reaches up to 80% or more. Also in the case of the thickness t=4.5 mm, if the nozzle diameter reaches 4.8 mm, the ratio where rusting is 10% or less increases up to about 60% or more. And, if the nozzle diameter reaches 6.9 mm or greater, the ratio increases up to 80% or more. It is preferable in light of rust prevention to make the nozzle diameter larger.

Laser cutting was carried out in the range of from 0.4 MPa to 2.0 MPa in pressure of the assist gas and exposure tests for 12 weeks were carried out in regard to the cut surfaces. Representative results thereof were shown in FIGS. 13-15. Meanwhile, the processing conditions are indicated at the heads of the respective drawings, and cutting was carried out under proper conditions of cutting speeds (F: 10000 mm/min or such) and nozzle diameters in accordance with changes in thickness of the sheets to be cut. And, the results shown in FIGS. 13-15 and effects of rust prevention obtained by the other exposure tests were rendered into a graph shown in FIG. 16.

Figure 16:
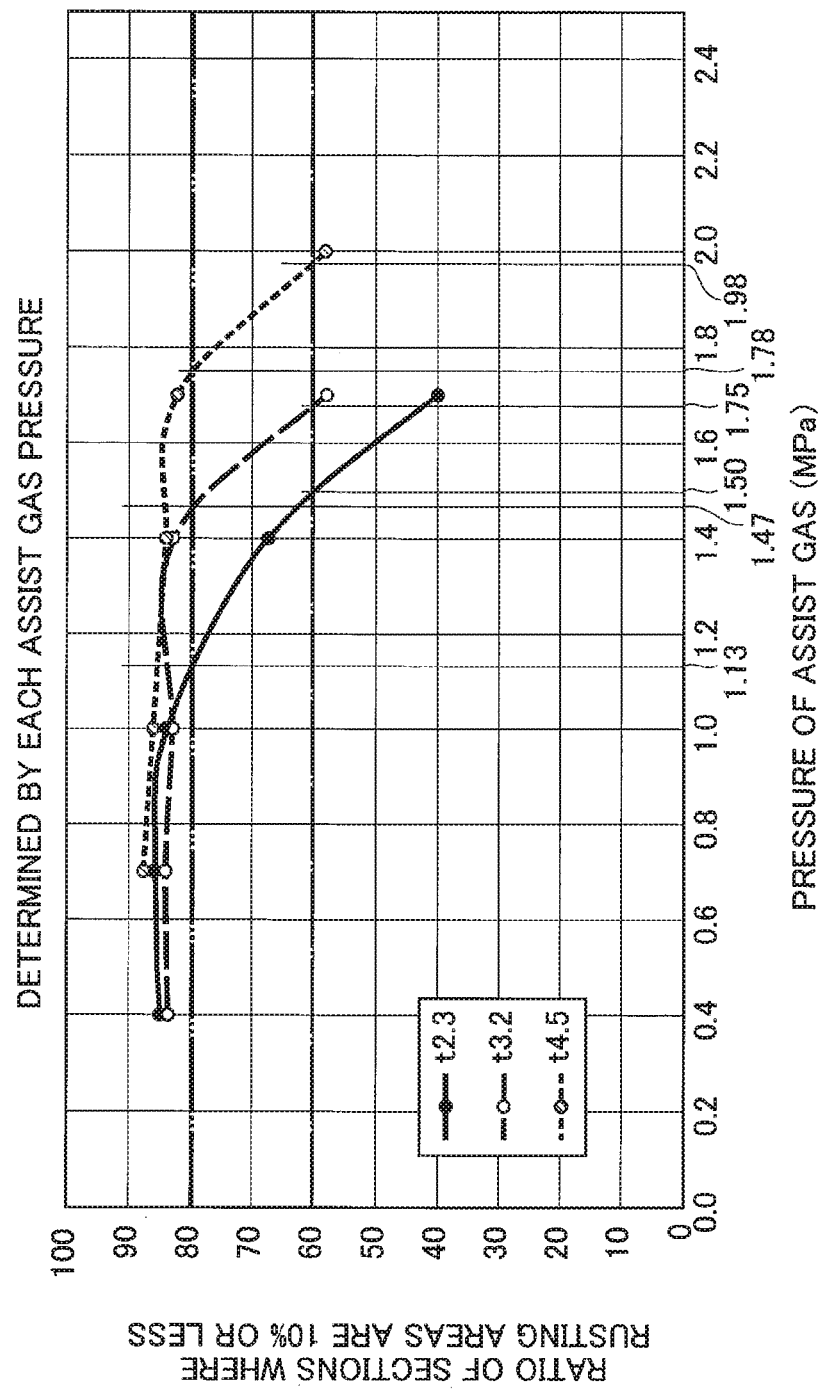
FIG. 16 is an explanatory drawing that summarizes the results of the exposure tests shown in FIGS. 13-15.
Figure 17:
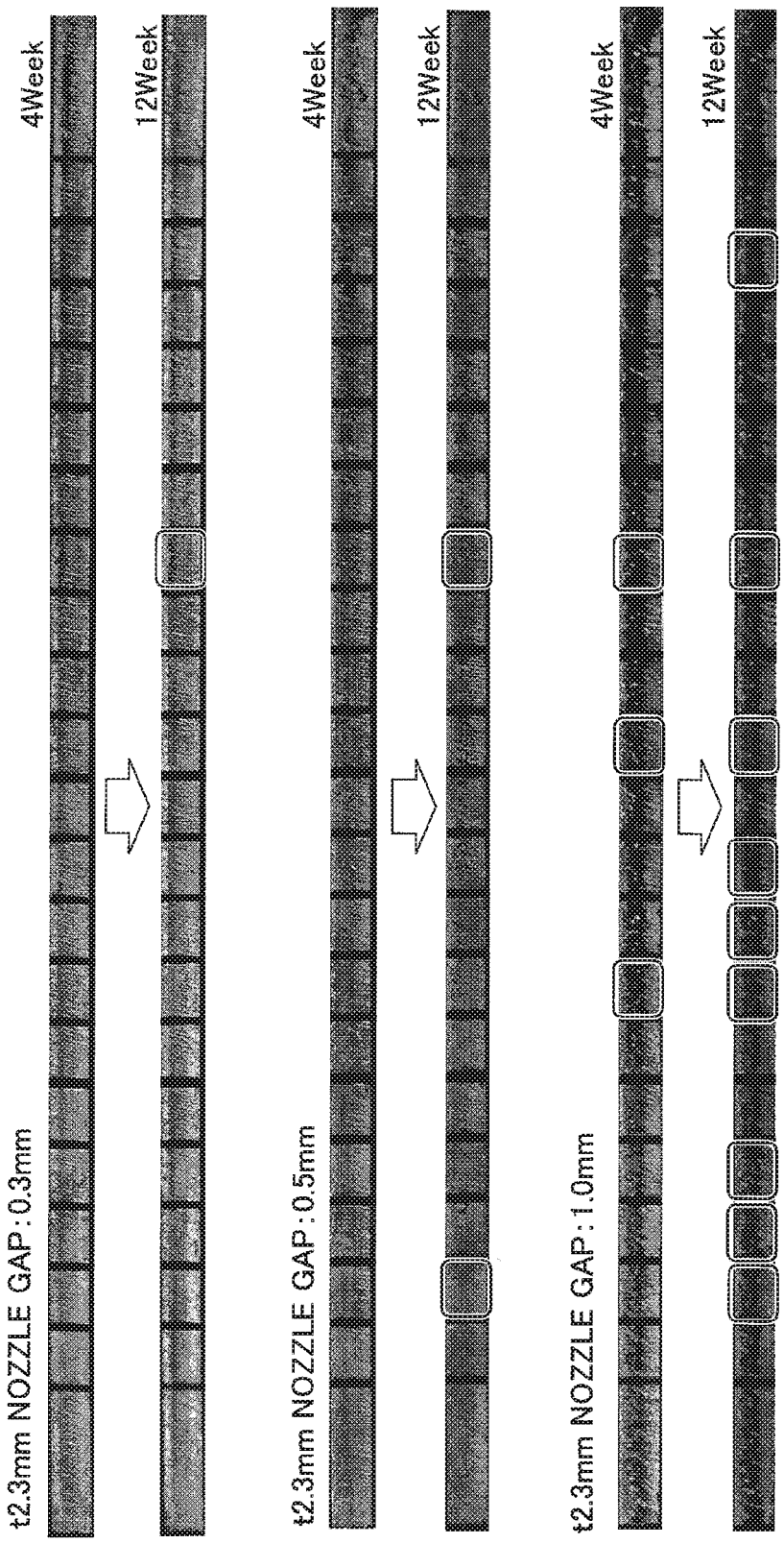
FIG. 17 is an explanatory drawing showing results of exposure tests depending on nozzle gaps.
Figure 18:
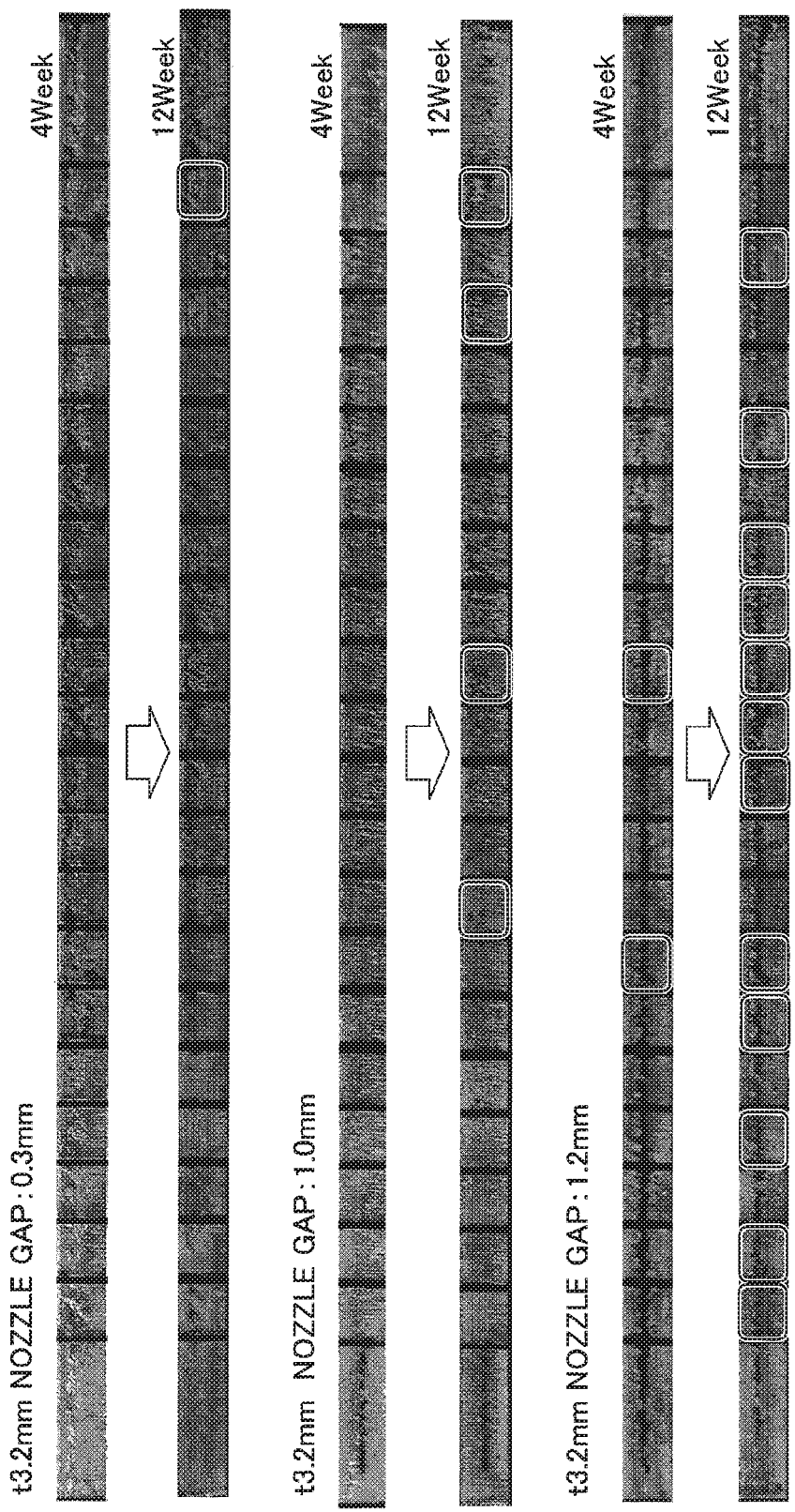
FIG. 18 is an explanatory drawing showing results of exposure tests depending on nozzle gaps.
Figure 19:
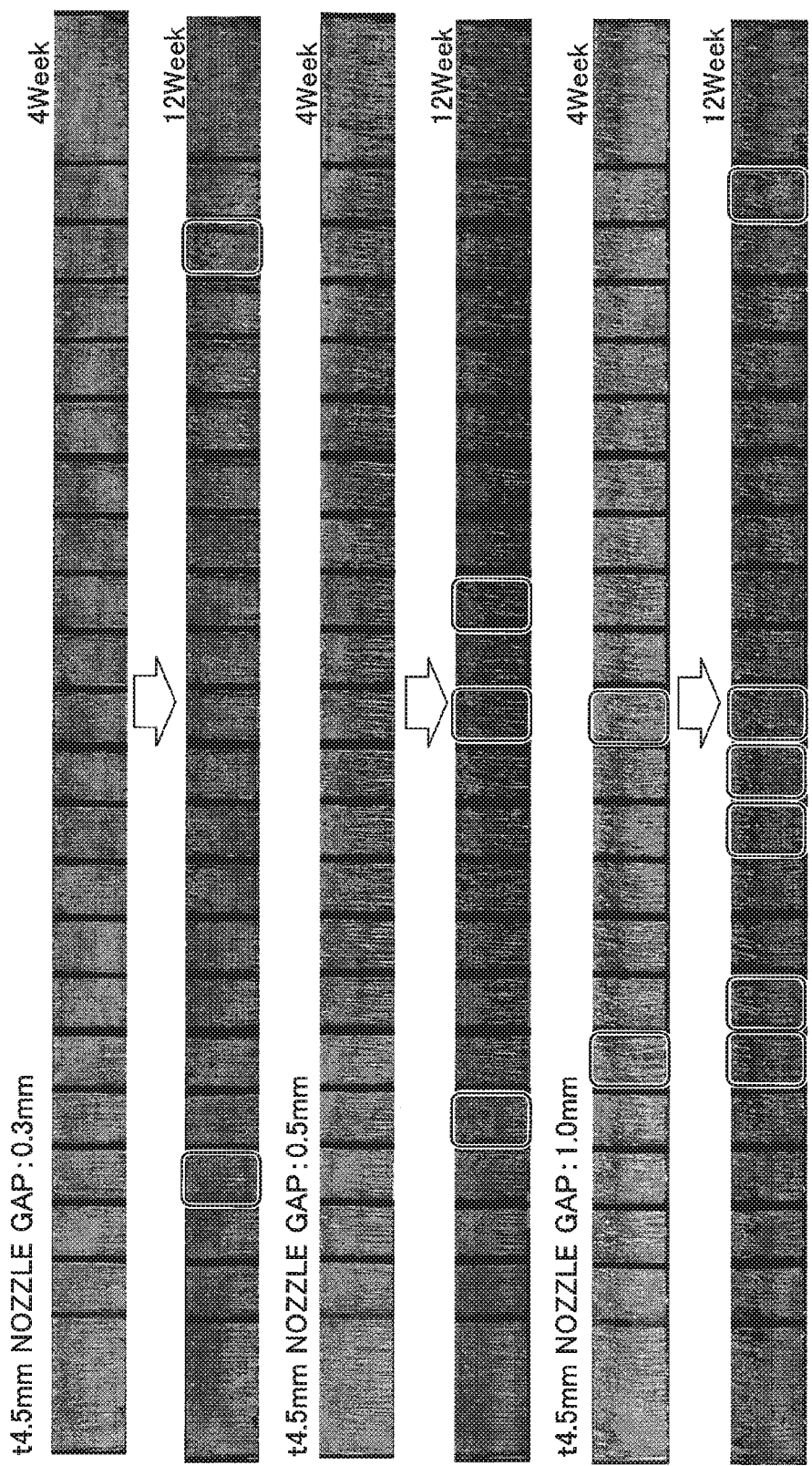
FIG. 19 is an explanatory drawing showing results of exposure tests depending on nozzle gaps.

As being apparent from FIG. 16, where a standard is set as to whether a ratio where rusting is 10% or less is greater than 60%, 1.5 MPa or less in a case of the thickness t=2.3 mm, 1.75 MPa or less in a case of the thickness t=3.2 mm and 1.98 MPa or less in a case of the thickness t=4.5 mm are preferable in light of rust prevention. Similarly as being apparent from FIG. 16, where a standard is set as to whether a ratio where rusting is 10% or less is greater than 80%, 1.13 MPa or less in a case of the thickness t=2.3 mm, 1.47 MPa or less in a case of the thickness t=3.2 mm and 1.78 MPa or less in a case of the thickness t=4.5 mm are preferable in light of rust prevention. In other words, it is preferable in light of rust prevention to set the assist gas pressure not to be excessively high.

Laser cutting was carried out in the range of from 0.3 mm to 1.2 mm in nozzle gap and exposure tests for 12 weeks were carried out in regard to the cut surfaces. Representative results thereof were shown in FIGS. 17-19. Meanwhile, the processing conditions are indicated at the heads of the respective drawings, and cutting was carried out under proper conditions of cutting speeds (F: 10000 mm/min or such), assist gas pressures and nozzle diameters in accordance with changes in thickness of the sheets to be cut. And, the results shown in FIGS. 17-19 and effects of rust prevention obtained by the other exposure tests were rendered into a graph shown in FIG. 20.

Figure 20:
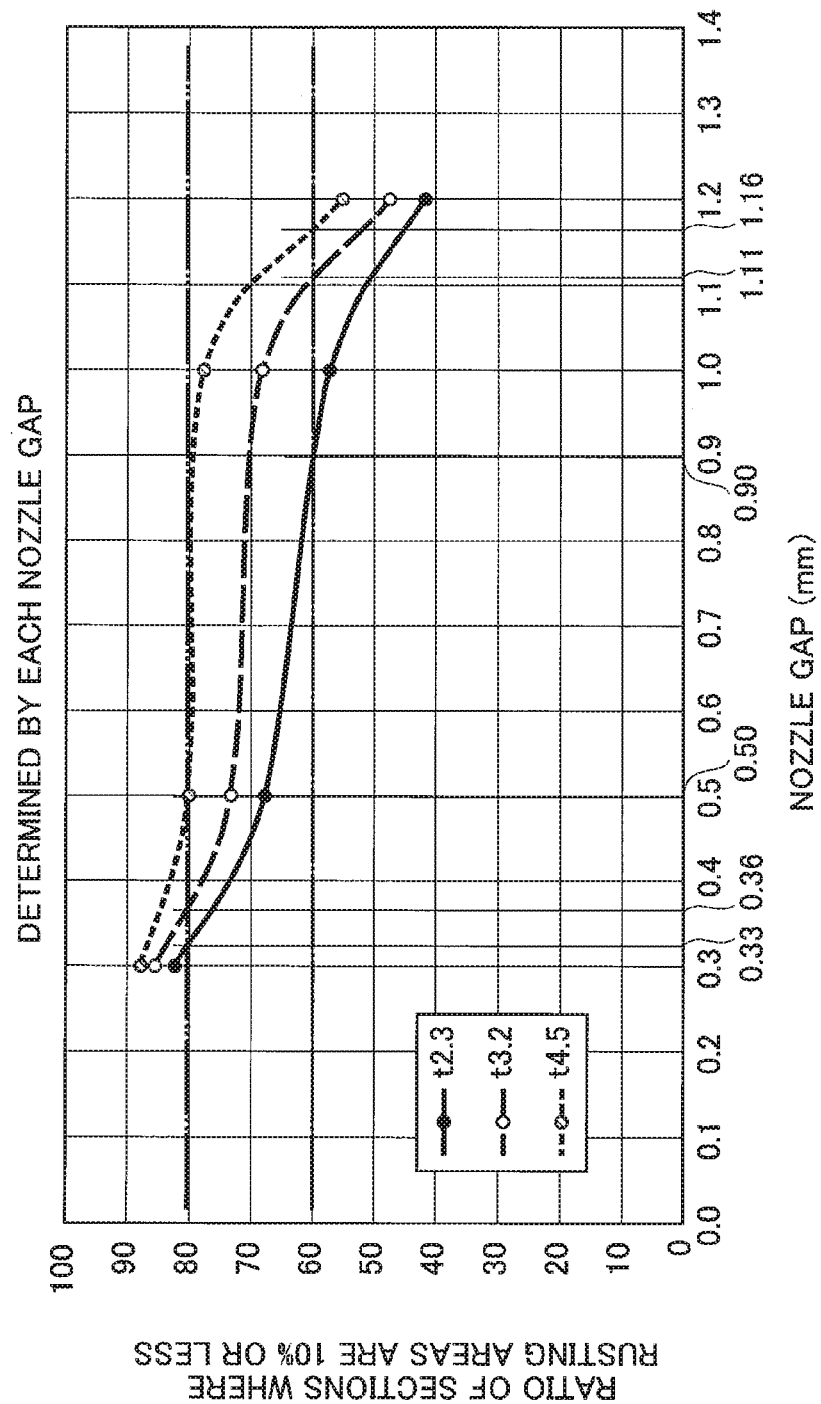
FIG. 20 is an explanatory drawing that summarizes the results of the exposure tests shown in FIGS. 17-19.
Figure 21:
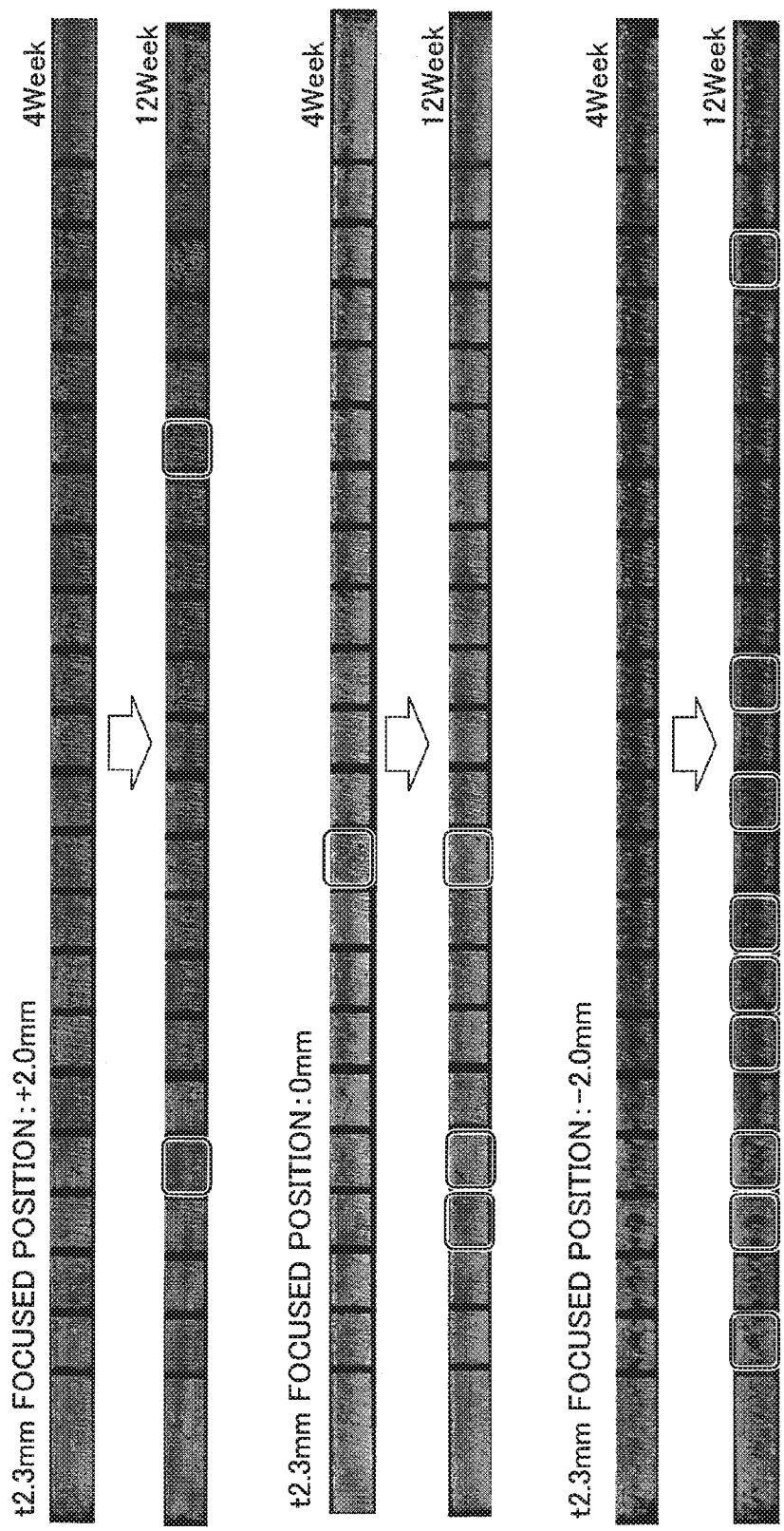
FIG. 21 is an explanatory drawing showing results of exposure tests depending on focused points.
Figure 22:
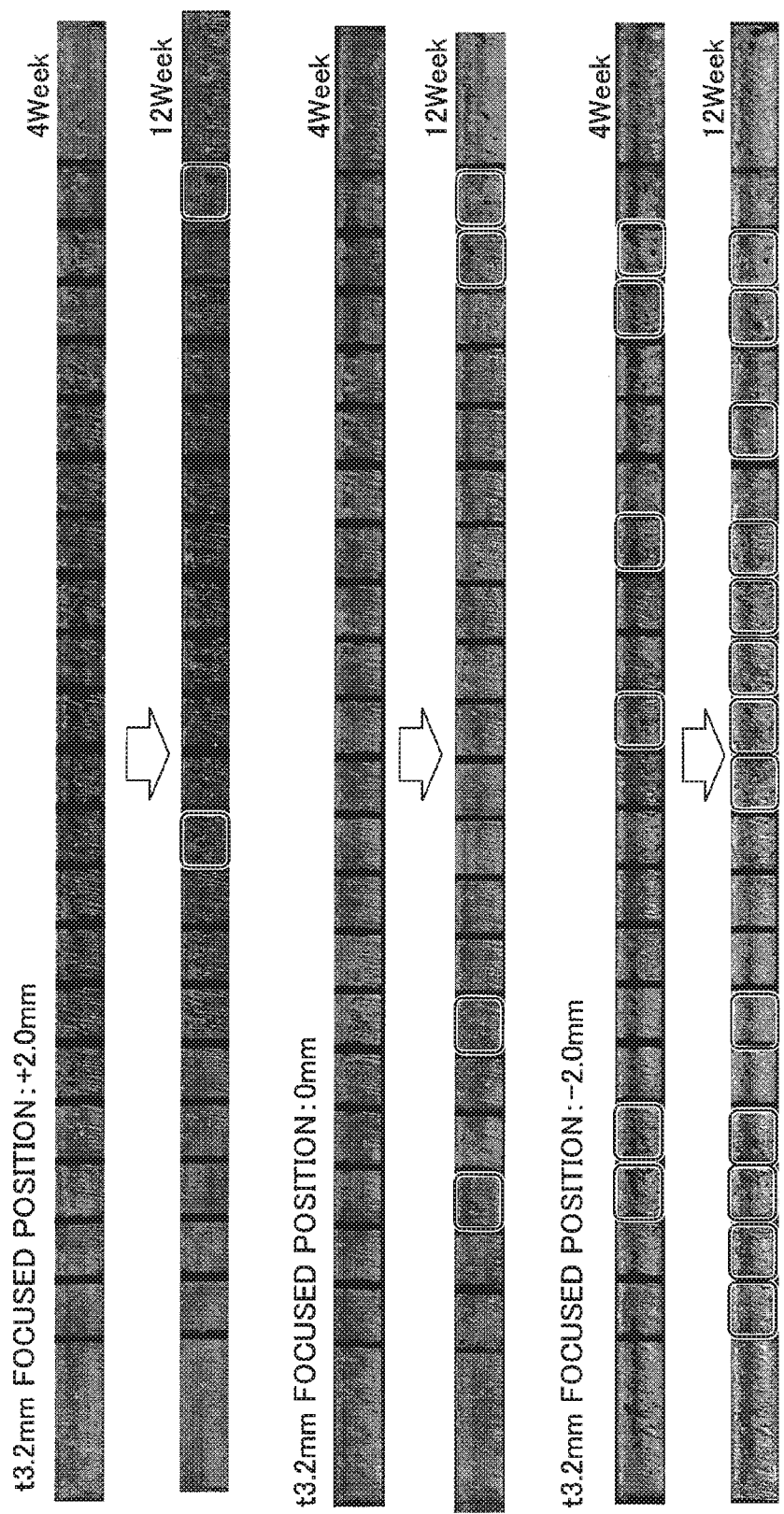
FIG. 22 is an explanatory drawing showing results of exposure tests depending on focused points.
Figure 23:
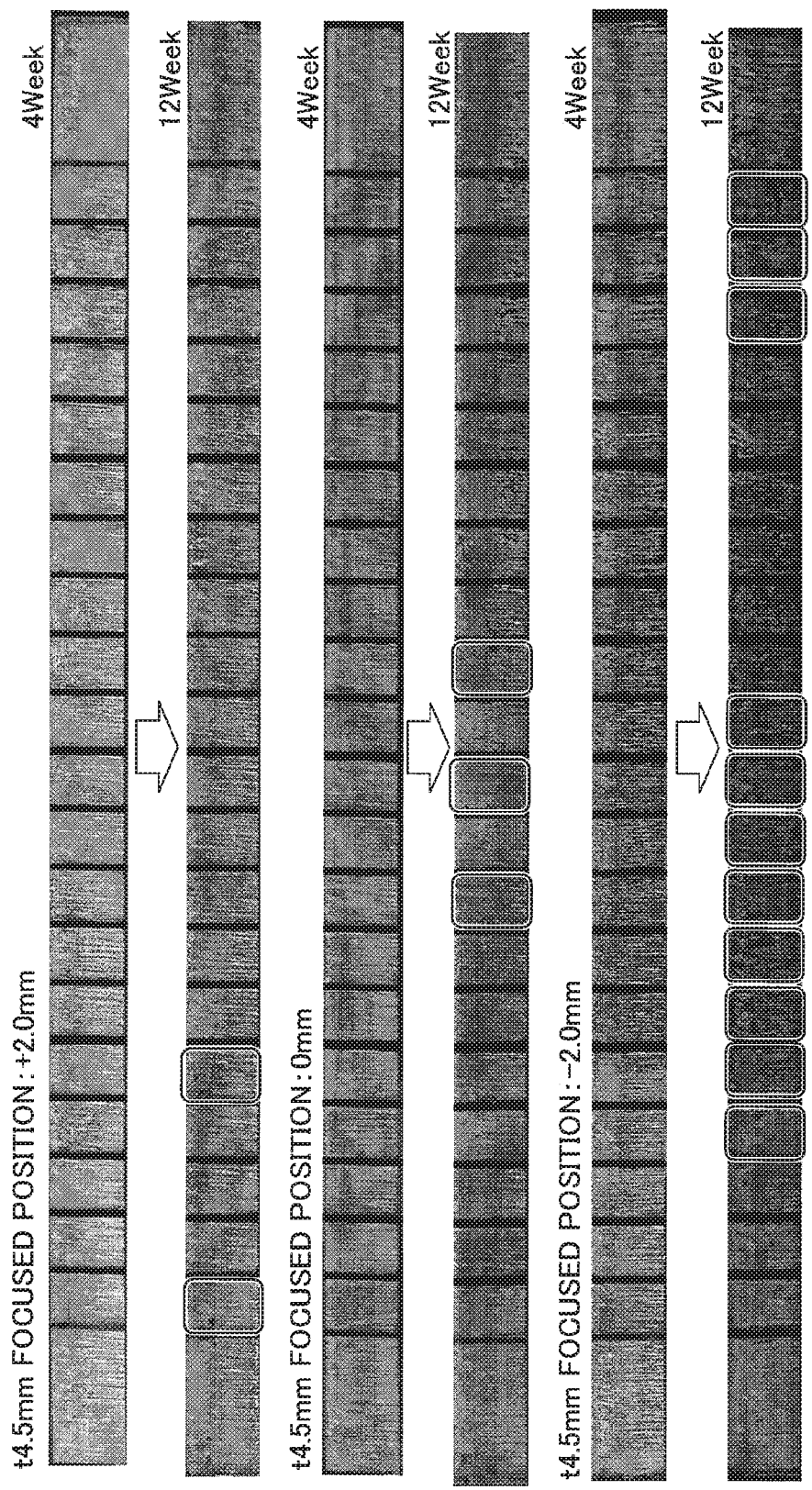
FIG. 23 is an explanatory drawing showing results of exposure tests depending on focused points.

As being apparent from FIG. 20, cases where ratios where rusting is 10% or less is greater than 60% are obtained under the following conditions. Specifically, a case where the nozzle gap is 0.90 mm or less when the thickness t=2.3 mm, the nozzle gap is 1.11 mm or less when the thickness t=3.2 mm and the nozzle gap is 1.16 mm or less when the thickness t=4.5 mm. Similarly as being apparent from FIG. 20, cases where a ratio where rusting is 10% or less is greater than 80% are obtained under the following conditions.

Specifically, a case where the nozzle gap is 0.33 mm or less when the thickness t=2.3 mm, the nozzle gap is 0.36 mm or less when the thickness t=3.2 mm and the nozzle gap is 0.50 mm or less when the thickness t=4.5 mm.

Therefore, it is preferable in light of rust prevention to set the nozzle gap to be narrower.

Laser cutting was carried out in the focused position range of from +2.0 mm to −2.0 mm ("+" means upper above the workpiece upper surface, "−" means lower below the workpiece upper surface and the workpiece upper surface of itself is 0.0 mm; and exposure tests for 12 weeks were carried out in regard to the cut surfaces. Representative results thereof were shown in FIGS. 21-23. Meanwhile, the processing conditions are indicated at the heads of the respective drawings, and cutting was carried out under proper conditions of cutting speeds (F: 10000 mm/min or such), assist gas pressures and nozzle diameters in accordance with changes in thickness of the sheets to be cut. And, the results shown in FIGS. 21-23 and effects of rust prevention obtained by the other exposure tests were rendered into a graph shown in FIG. 24.

Figure 24:
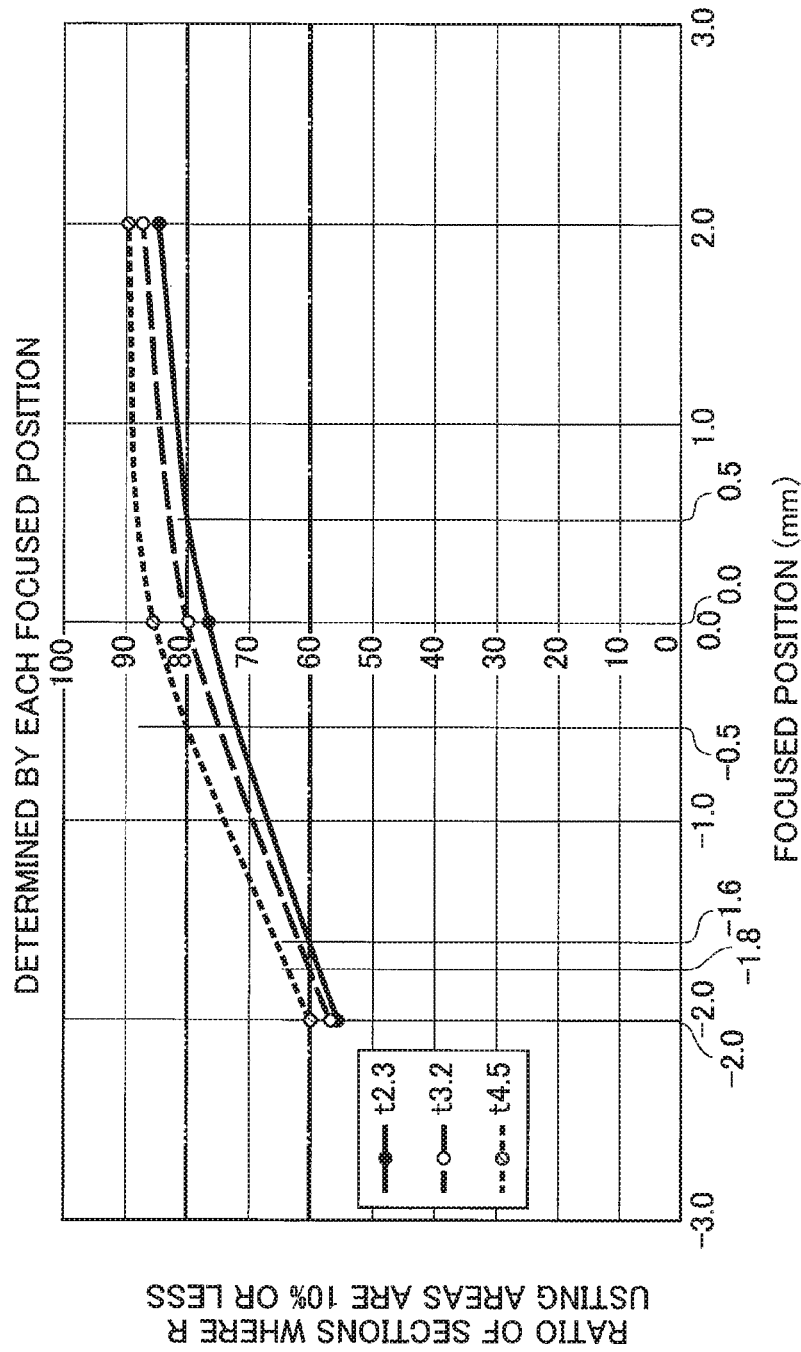
FIG. 24 is an explanatory drawing that summarizes the results of the exposure tests shown in FIGS. 21-23.
Figure 25:
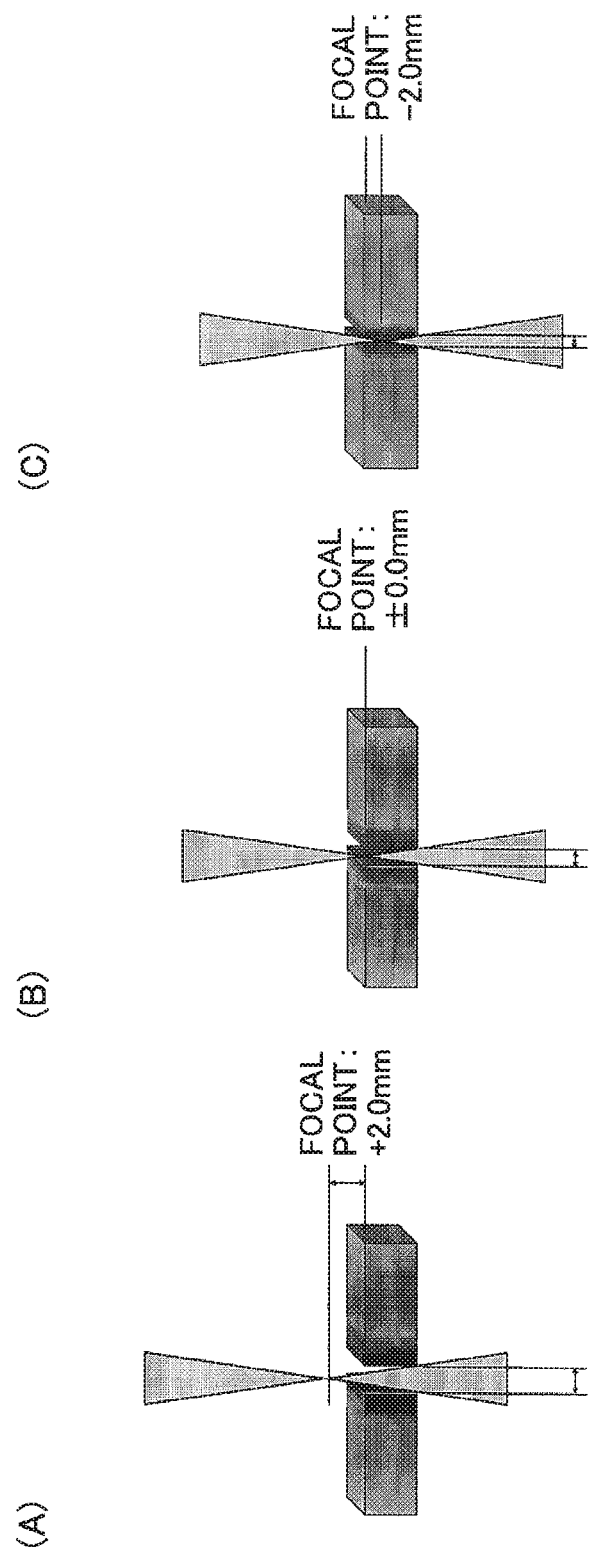
FIG. 25 is an explanatory drawing showing that widths of cut grooves vary depending on focused points and thereby effects of rust prevention vary.
Figure 26:
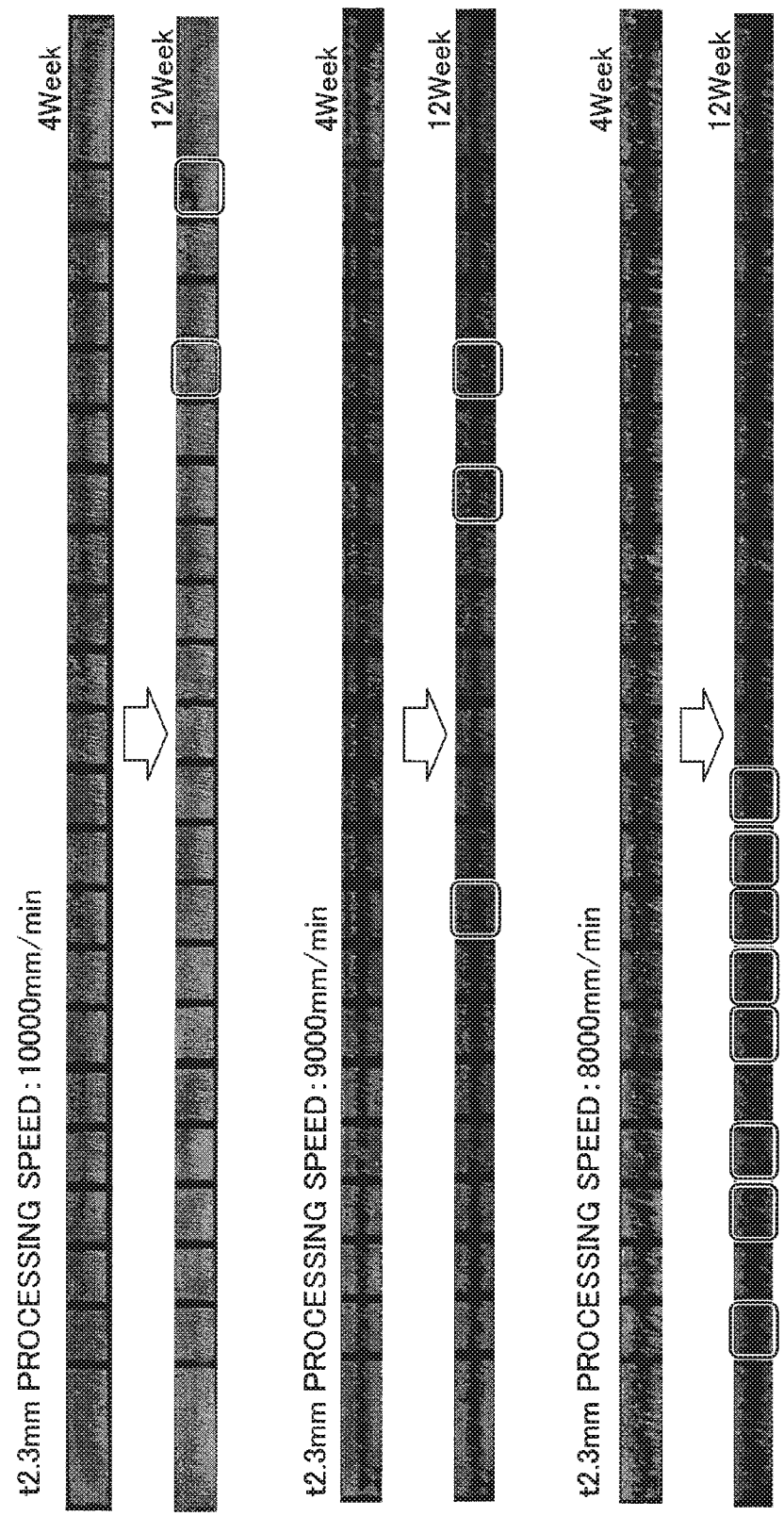
FIG. 26 is an explanatory drawing showing results of exposure tests depending on focused points.
Figure 27:
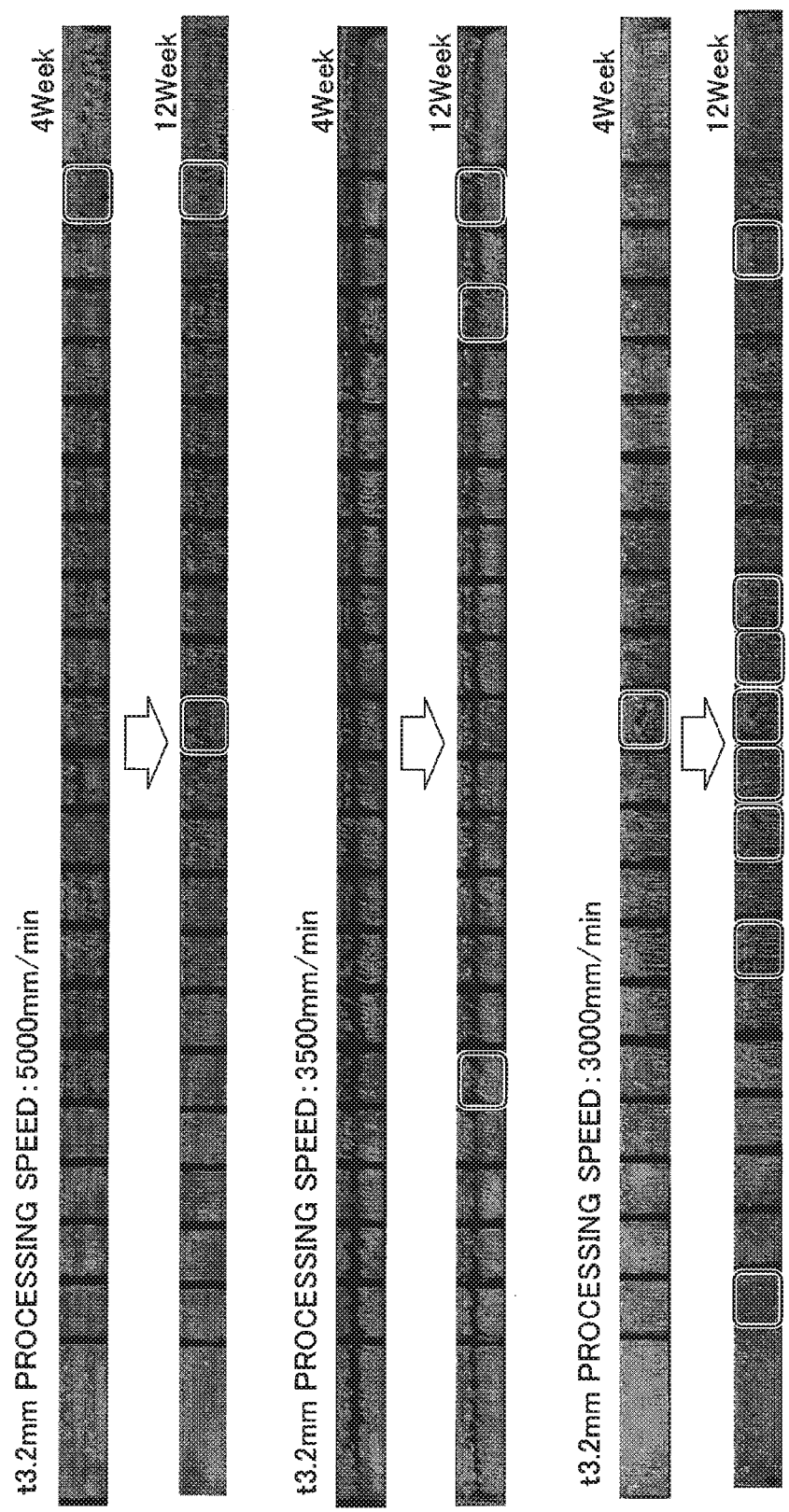
FIG. 27 is an explanatory drawing showing results of exposure tests depending on focused points.
Figure 28:
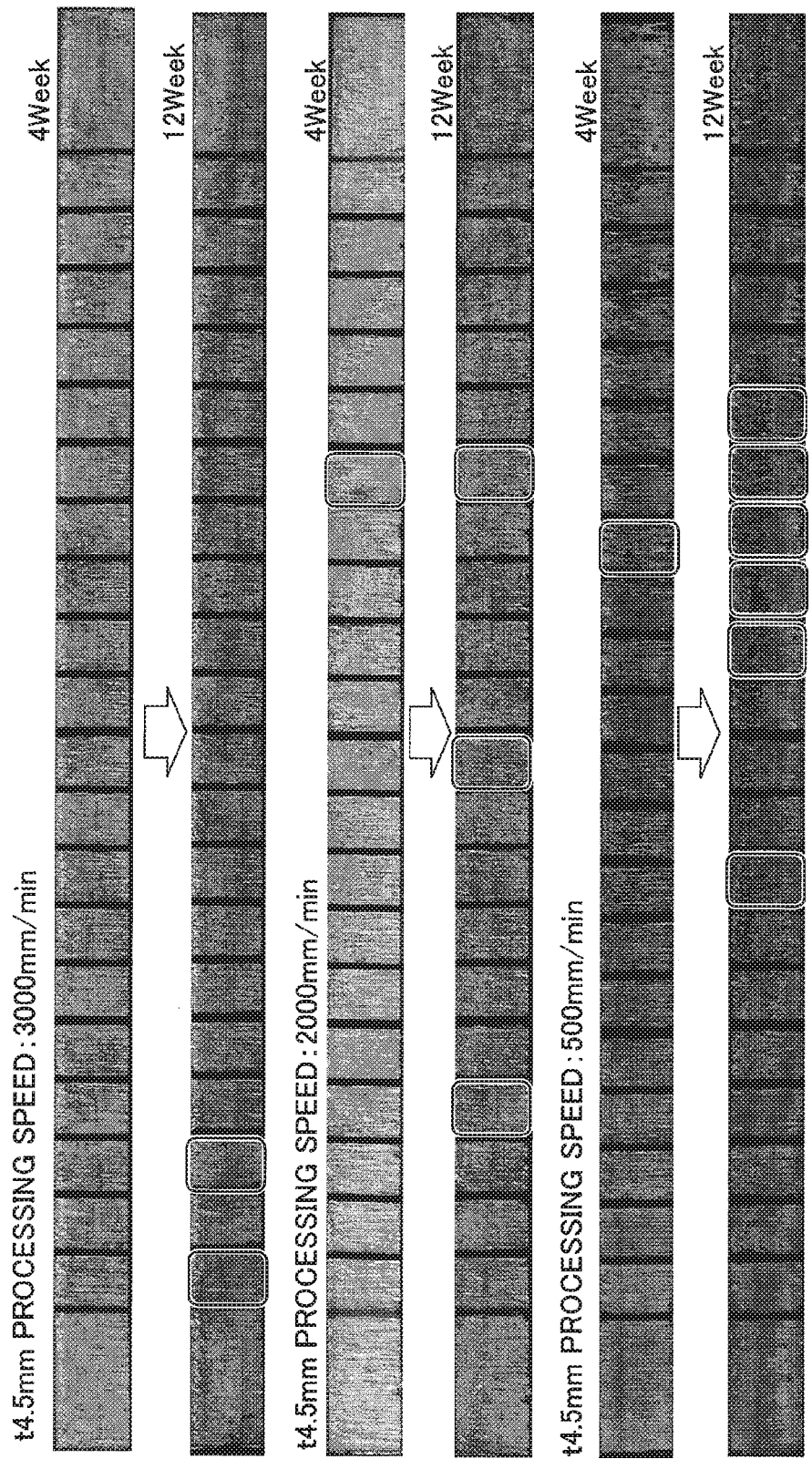
FIG. 28 is an explanatory drawing showing results of exposure tests depending on focused points.

As being apparent from FIG. 24, where a standard is set as to whether a ratio where rusting is 10% or less is greater than 60%, focused positions equal to −1.6 mm or larger in a case of the thickness t=2.3 mm, focused positions equal to −1.8 mm or larger in a case of the thickness t=3.2 mm and focused positions equal to −2.0 mm or larger in a case of the thickness t=4.5 mm are preferable in light of rust prevention. Similarly as being apparent from FIG. 24, where a standard is set as to whether a ratio where rusting is 10% or less is greater than 80%, focused positions equal to 0.5 mm or larger in a case of the thickness t=2.3 mm, focused positions equal to 0 mm or larger in a case of the thickness t=3.2 mm and focused positions equal to −0.5 mm or larger in a case of the thickness t=4.5 mm are preferable in light of rust prevention. Here, beam profiles in cases where focused positions are +2.0 mm, ±0.0 mm and −2.0 mm can be schematically shown as in FIGS. 25(A)-25(C). As shown in FIG. 25(A), provided that the focused position is moved upward from the workpiece upper surface relative to the focused position±0 mm (the case of FIG. 25(B)), the beam diameter incident onto the workpiece becomes relatively larger and therefore the laser energy density becomes relatively smaller. Therefore it is required to increase the input heat amount into the base material in order to cut it and thus the range where the plated composition fuses on the workpiece upper surface gets broader. This means that a sufficient amount of a plated composition can fuse enough to cover the cut surface. Further, since the cut width becomes relatively wider as the beam diameter gets relatively larger, the assist gas can sufficiently pours to the cut surface. This means that a sufficient amount of a plated composition can fuse enough to cover the cut surface.

Specifically, in accordance with the example shown in FIG. 25(A), since the sufficient molten plated composition is assured to cover the cut surface and as well the sufficient assist gas flows in order to pour the molten plated composition into the cut surface, the cut surface can be covered with the molten plated composition and thus the sufficient rust prevention effect can be obtained. As shown in FIG. 25(B), in the case where the focused position of the laser is aligned with the workpiece upper surface to carry out cutting, as compared with the case shown in FIG. 25(A), the laser energy density is made higher and the input heat amount is reduced, and thereby the range where the plated composition fuses on the workpiece upper surface gets narrower. Thus it is hard to assure the amount of the fused mater of the plated composition necessary to cover the cut surface. Further, since the cut width gets smaller as the beam diameter gets narrower, the assist gas hardly pours to the cut surface. Thus it is hard to make the molten plated composition on the workpiece upper surface flow.

Specifically, as compared with the example shown in FIG. 25(A), according to the case shown in FIG. 25(B), since the molten plated composition on the workpiece upper surface gets reduced and as well the assist gas gets hard to flow to the cut surface, the molten plated composition is hard to flow around the cut surface, and, since the molten plated composition hardly covers the cut surface, the rust prevention effect is reduced.

As shown in FIG. 25(C), in a case where the focused position is moving downward from the workpiece upper surface relative to the focused position±0 mm, since the laser energy density gets higher and the input heat into the base material decreases as compared with those in the example shown in FIG. 25(B), the range where the plated composition fuses on the workpiece upper surface gets narrower. Thus it is hard to assure an amount of the molten plated composition required to cover the cut surface. Further, as the beam diameter gets smaller and therefore the cut width gets narrower, the assist gas hardly flows around the cut surface. Thus the molten plated composition on the workpiece upper surface is hardly made to flow to the cut surface.

More specifically, as compared with the example shown in FIG. 25(B), according to the example shown in FIG. 25(C), since the molten plated composition on the workpiece upper surface gets reduced and the assist gas comes to hardly flow around the cut surface, the molten plated composition hardly comes around the cut surface and thus the cut surface becomes not sufficiently covered with the molten plated composition, thereby reducing the rust prevention effect further.

Therefore, in light of the rust prevention effect, it is considered that it is preferable to set the focused position somewhat high.

Next, laser cutting was carried out in the processing speed range of from 500 mm/min to 12000 mm/min and exposure tests for 12 weeks were carried out in regard to the cut surfaces. Representative results thereof were shown in FIGS. 26-28. And, the results shown in FIGS. 26-28 and effects of rust prevention obtained by the other exposure tests were shown as a graph of FIG. 29.

Figure 29:
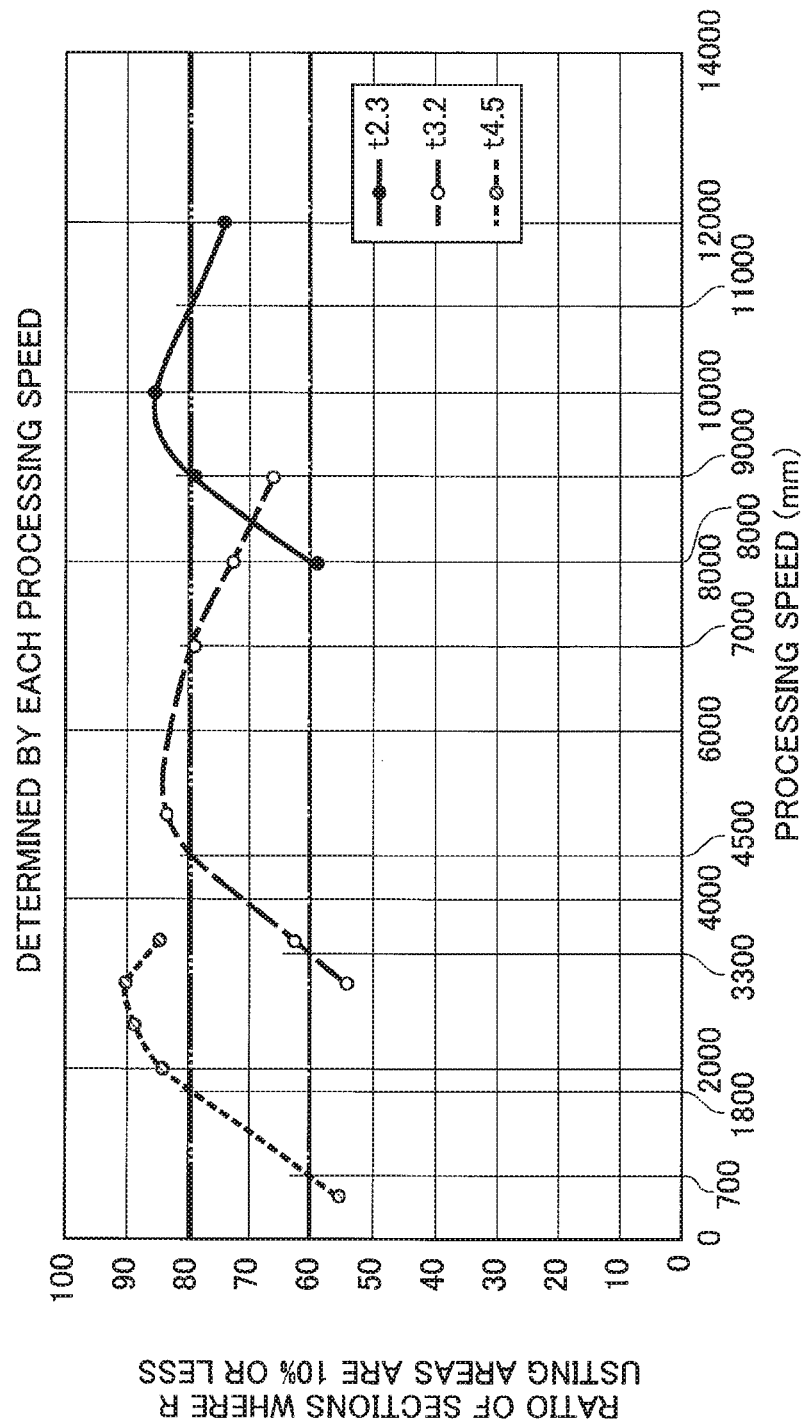
FIG. 29 is an explanatory drawing that summarizes the results of the exposure tests shown in FIGS. 26-28.

As being apparent from FIG. 29, where a standard is set as to whether a ratio where rusting is 10% or less is greater than 60%, processing speeds about 8000 mm/min or higher meets the standard in a case of the thickness t=2.3 mm. If the processing speed exceeds 9000 mm/min, the ratio where rusting is 10% or less increases up to about 80% or more. If the processing speed increases up to 10000 mm/min or more, this ratio gradually decreases as the processing speed increases. And, if the processing speed increase up to 11000 mm/min or more, this ratio decreases down to 80% or less. Therefore, it is preferable in light of rust prevention to set the processing speed to be in the range of from 8000 mm/min to 12000 mm/min in a case of the thickness t=2.3 mm, and more preferable to set it to be in the range of from 9000 mm/min to 11000 mm/min.

Further, in a case of the thickness t=3.2 mm, as being apparent from FIG. 29, it is preferable in light of rust prevention to set the processing speed of from 3300 mm/min to 9000 mm/min and further preferable to set it to be in the range of from 4500 mm/min to 7000 mm/min in a case of the thickness t=4.5 mm, it is preferable in light of rust prevention to set the processing speed of from 700 mm/min to 8300 mm/min and further preferable to set it to be in the range of from 1800 mm/min to 3300 mm/min. However, if the processing speed is excessively high, sometimes cutting is disabled because the input heat into the workpiece decreases.

The control device 35 in the laser processing device 1, as shown in FIG. 2, includes a computer controlled by a software, which achieves a function of regulating motion and position of the laser processing head 5 relative to the workpiece W, a function of laser output at the laser oscillator 11, and a function of regulating supplying pressure of the pressure gas to the laser processing head 5.

The control device 35 is provided with a processing program storage section 37 memorizing the processing program for carrying out laser cutting on the workpiece W. Further, the control device 35 is provided with a parameter storage section 39 for storing various parameters at the time of the laser processing on the workpiece W. Still further, the control device 35 is provided with a screen display data storage section 41 memorizing data to indicate laser cutting positions on a screen or such.

To the control device 35 connected is a display section 43. This display section 43 is connected to a screen processing section 45 that the control device 35 has. Further, the control device 35 is provided with an input control section 47. To this control section 47 connected is an input section 49. This input section 49 is for inputting data necessitated by the aforementioned test results, changes in the program, changes in the processing condition, manual operations of respective axes and such into the computer.

The control device 35 is provided with a processing condition storage section 51 which stores the processing condition applied to the laser cutting on the workpiece W.

In this processing condition storage section 51 stored is the plurality of processing conditions, each of which consists of a beam profile (a focused light diameter, a Rayleigh length), a processing speed, a nozzle diameter, an assist gas type, an assist gas pressure, a nozzle gap and a focused position correlated with each material property or each processing condition number.

When executing processing, a processing program stored in the processing program storage section 37 is read out and then executed. Based on a thickness, a material property and a processing condition number embedded in the processing program or stored in the exterior, it selects a processing condition corresponding thereto from the processing conditions stored in the processing condition storage section 51.

On the basis of the beam profile in the selected processing condition, the control device 35 regulates the beam profile (the condensed light diameter, the Rayleigh length) by controlling the actuator 17 of the CF lens (collimation lens) 15, or controlling the pressurizing means 21A of the AO mirror 21.

Further, on the basis of the processing speed in the selected processing condition, the control device 35 regulates the processing speed by controlling the X-Y axes.

Similarly, on the basis of the nozzle gap and the focused position in the selected processing condition, the control device is capable of regulating the nozzle gap and the focused position by controlling the Z-axis. Further, on the basis of the assist gas type, the assist gas pressure and the density of the assist gas, by controlling the assist gas supply device 25, the assist gas type, the assist gas pressure, the density of the assist gas and such can be regulated.

Further, although not shown, on the basis of the nozzle diameter in the selected processing condition, any nozzle can be selected and then substituted.

The laser processing device 1 controlled by the control device 35 on the basis of the processing program can execute laser cutting on a workpiece under a processing condition arranged in advance.

Further, a processing condition file 53 stored in the processing condition storage section 51 contains a data file 55 for processing conditions respectively corresponding to durations of rust prevention of plated steel sheets. These processing conditions corresponding to the durations of rust prevention of the plated steel sheets contain combinations of processing conditions respectively corresponding to thicknesses and desired durations of rust prevention. Each processing condition consists of a beam profile (a condensed light diameter, a Rayleigh length), a processing speed, a nozzle diameter, an assist gas type, an assist gas pressure, a nozzle gap and a focused position, for example.

Where in the processing program a plated steel sheet is thus appointed to an applied material and a thickness and a desired duration of rust prevention are in advance appointed, the control device on the basis of the stored processing program selects a processing condition that can meet the desired duration of rust prevention and thereby controls the processing machine, thereby processing the workpiece so as to provide the desired duration of rust prevention.

The respective data files 55, here, stores processing conditions in which each thickness is correlated to each duration of rust prevention. To provide some ranges, however, a plurality of processing speeds and a plurality of gas pressures may be stored therein for example.

In the meantime, these processing condition files are in advance stored in a storage device. This work for making them stored is based on the following steps. Specifically, with changing processing conditions on each thickness, processing is executed and respective processed workpieces are then subject to exposure tests. Affirming processing conditions on each duration of rust prevention, the processing conditions are on the basis of the results made to be stored.

Meanwhile, it is not necessary that the material, the thickness and the duration of rust prevention are in advance appointed. It is possible that the processing program contains only the thickness and the material, an operator at a time to execute processing inputs a desired duration of rust prevention via the input means into the control device, and it selects a desired processing condition from the processing condition files on the basis of the input duration of rust prevention.

Figure 30:
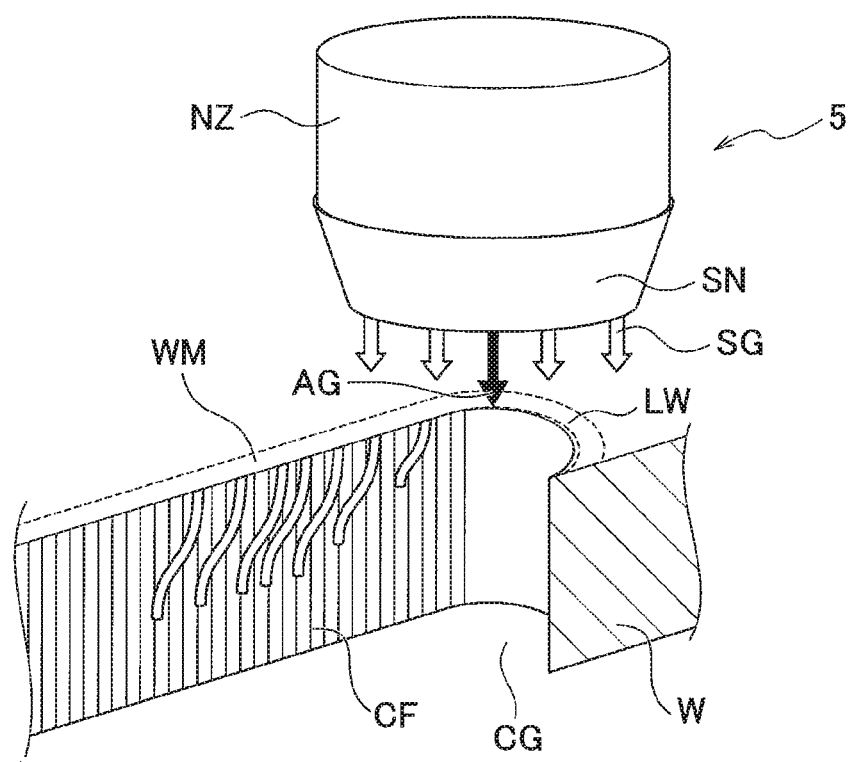
FIG. 30 is an explanatory drawing schematically and generally showing a constitution of a preferable laser processing head.

The laser processing head 5 can be constituted as shown in FIG. 30. Specifically, the laser processing head 5 is provided with a nozzle NZ for emitting an assist gas AG and an auxiliary gas nozzle SN for emitting an auxiliary gas SG.

The assist gas AG emitted onto a section LW subject to the laser processing of the plated steel sheet W through the nozzle NZ blows molten metal away to form a cut surface CF. The auxiliary gas SG emitted through the auxiliary gas nozzle SN guides the molten plate metal WM on the upper surface of the plated steel sheet to the formed cut surface CF. The auxiliary gas nozzle SN is so configured as to emit the auxiliary gas SG onto a range broader than a width of the cut groove CG formed by the laser cutting.

Therefore, at a time of the laser cutting on the plated steel sheet W, a part of the plate metal in a molten state at the upper edge of the cut groove CG is guided to the interior of the cut groove CG, thereby efficiently covering the cut surface CF.

In the present embodiment, nitrogen is used as the assist gas but not limited thereto. A mixture gas of nitrogen 96% or more and oxygen 4% or less is applicable.

In the present embodiment, a quality of the laser beam (BPP) at a time of cutting the plated steel sheet is of a laser of from 0.34 mm*mrad to 20 mm*mrad.

Although certain exemplary embodiments are described above, modifications and variations of the embodiments will occur to those skilled in the art, in light of the above teachings.

INDUSTRIAL APPLICABILITY

A laser cutting method or a laser cutting device that can guides a part of a molten plate layer to a cut surface to have the cut surface covered therewith is provided.

The invention claimed is:

1. A laser cutting method for fusing a part of a Zn plating layer of a Zn plated steel sheet to cover a cut surface formed in the Zn plated steel sheet, and the Zn plated steel sheet having a thickness in a range from 2.3 mm to 4.5 mm with the fused part of the Zn plating layer, the laser cutting method comprising:
  selecting a processing condition to provide a cut width and the cut surface to make the fused part of the Zn plating layer on an upper surface of a steel plate of the Zn plated steel sheet flow to and cover the cut surface in accordance with the thickness of the Zn plated steel sheet;
  cutting the Zn plated steel sheet by irradiating the Zn plated steel sheet with laser light at a wavelength in a 1 micrometer band and having a condensed light diameter regulated under the selected processing condition in a range from 0.151 mm to 0.206 mm and a Rayleigh length in a range from 1.688 mm to 3.228 mm, thereby forming a cut surface in the Zn plated steel sheet; and
  emitting assist gas onto the cut surface of the Zn plated steel sheet to make the fused part of the Zn plating layer of the Zn plated steel sheet, which is fused by irradiation of the laser light, flow to the cut surface so as to cover the cut surface with the Zn.

2. The laser cutting method of claim 1, further comprising:
  regulating a focused position of the laser light in a range from −2.0 mm to +2.0 mm.

3. The laser cutting method of claim 1, further comprising:
  regulating a gap between a nozzle for emitting the assist gas and an upper surface of the plated steel sheet in a range from 0.3 mm to 1.2 mm.

4. The laser cutting method of claim 1, further comprising:
  regulating a pressure of the assist gas in a range from 0.4 MPa to 2.0 MPa.

5. The laser cutting method of claim 1, further comprising:
  regulating a processing speed in a range from 700 mm/min to 12000 mm/min.

6. The laser cutting method of claim 1, wherein a diameter of a nozzle for emitting the assist gas is from 2.0 mm to 7.0 mm.

7. The laser cutting method of claim 1, wherein the assist gas is a nitrogen gas.

8. The laser cutting method of claim 1, wherein the Rayleigh length in the range from 1.688 mm to 3.228 mm is configured to promote molten Zn flow to the cut surface of the Zn plated steel sheet.

9. A laser processing head in use for cutting a Zn plated steel sheet having a Zn plating layer, and the Zn plated steel sheet having a thickness in a range from 2.3 mm to 4.5 mm by irradiating the Zn plated steel sheet with laser light at a wavelength in a 1 micrometer band and having a condensed light diameter in a range from 0.151 mm to 0.206 mm and a Rayleigh length in a range from 1.688 mm to 3.228 mm, thereby forming a cut surface in the Zn plated steel sheet, and emitting assist gas onto the cut surface to blow molten metal away to expose the cut surface, and emitting auxiliary gas onto the cut surface of the Zn plated steel sheet to make a fused part of the Zn plating layer of the Zn plated steel sheet, which is fused by irradiation of the laser light, flow to the cut surface so as to cover the cut surface with the fused part of the Zn plating layer, the laser processing head comprising:
- a nozzle configured to emit the assist gas onto the cut surface so that the assist gas blows the molten metal away to expose the cut surface; and
- an auxiliary gas nozzle configured to emit auxiliary gas for guiding a molten Zn on an upper surface of the fused part of the Zn plating layer of the Zn plated steel sheet to the cut surface.

10. The laser processing head of claim 9, wherein the auxiliary gas nozzle is so configured as to emit the auxiliary gas onto a range broader than a width of a cut groove formed on the plated steel sheet during the cutting.

11. The laser processing head of claim 9, wherein the Rayleigh length in the range from 1.688 mm to 3.228 mm is configured to promote molten Zn flow to the cut surface of the Zn plated steel sheet.

12. A laser processing device in use for cutting a Zn plated steel sheet covered with Zn and having a thickness in a range from 2.3 mm to 4.5 mm, comprising:
- a work table configured to support the Zn plated steel sheet as a workpiece;
- a laser processing head configured to irradiate the workpiece with laser light with moving relative to the workpiece to cut the workpiece and emit assist gas onto a cut surface formed by the laser light in the Zn plated steel sheet to make a molten Zn on an upper surface of a fused part of a Zn plating layer of the Zn plated steel sheet flow to the cut surface so as to cover the cut surface with the molten Zn;
- a laser oscillator configured to develop oscillation to radiate and supply laser light at a wavelength in a 1 micrometer band to the laser processing head;
- a motor for moving the laser processing head relative to the workpiece;
- pressure regulator for supplying the assist gas to the laser processing head with controlling a pressure of the assist gas;
- a combination of a CF lens and an AO mirror for regulating a condensed light diameter and a Rayleigh length of the laser light incident onto the workpiece;
- a Z-axis motor configured to move the combination of the CF lens and the AO mirror toward and away from the workpiece to regulate a focused position of the laser light incident onto the workpiece;
- a control device, including a computer and a processing condition storage section, configured to control actions of the laser oscillator, the motor, the pressure regulator, the combination of the CF lens and the AO mirror and the Z axis motor in accordance with a processing condition selected from conditions stored in the processing condition storage section and to regulate the position of the combination of the CF lens and the AO mirror to have the condensed light diameter in a range from 0.151 mm to 0.206 mm and the Rayleigh length in a range from 1.688 mm to 3.228 mm; and
- an input section for inputting required data to the control device.

13. The laser processing device of claim 12, wherein the processing condition storage section memorizes a plurality of processing conditions distinct from each other.

14. The laser processing device of claim 12, wherein the control device is configured to regulate the CF lens and the AO mirror to have the Rayleigh length in the range from 1.688 mm to 3.228 mm to promote molten Zn flow to the cut surface of the Zn plated steel sheet.

* * * * *